United States Patent
Pan et al.

(10) Patent No.: US 10,706,334 B2
(45) Date of Patent: Jul. 7, 2020

(54) TYPE PREDICTION METHOD, APPARATUS AND ELECTRONIC DEVICE FOR RECOGNIZING AN OBJECT IN AN IMAGE

(71) Applicant: Alibaba Group Holding Limited, Grand Cayman (KY)

(72) Inventors: Pan Pan, Beijing (CN); Wei Liu, Hangzhou (CN); Min Li, Beijing (CN); Yingya Zhang, Beijing (CN); Xiansheng Hua, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 60 days.

(21) Appl. No.: 15/900,572

(22) Filed: Feb. 20, 2018

(65) Prior Publication Data
US 2018/0239989 A1    Aug. 23, 2018

(30) Foreign Application Priority Data

Feb. 20, 2017 (CN) .......................... 2017 1 0089723

(51) Int. Cl.
| | | |
|---|---|---|
| *G06K 9/62* | (2006.01) | |
| *G06K 9/70* | (2006.01) | |
| *G06K 9/68* | (2006.01) | |
| *G06K 9/46* | (2006.01) | |
| *G06K 9/00* | (2006.01) | |

(52) U.S. Cl.
CPC ............ *G06K 9/6282* (2013.01); *G06K 9/46* (2013.01); *G06K 9/629* (2013.01); *G06K 9/6292* (2013.01); *G06K 9/685* (2013.01); *G06K 9/70* (2013.01); *G06K 9/00664* (2013.01)

(58) Field of Classification Search
CPC .... G06K 9/00664; G06K 9/46; G06K 9/6282; G06K 9/629; G06K 9/6292; G06K 9/685; G06K 9/70
See application file for complete search history.

(56) References Cited

U.S. PATENT DOCUMENTS

| 9,251,402 B2 | 2/2016 | Sun et al. |
|---|---|---|
| 2011/0103700 A1 | 5/2011 | Haseyama |
| 2013/0195361 A1 | 8/2013 | Deng et al. |

(Continued)

FOREIGN PATENT DOCUMENTS

WO    WO2016107103    7/2016

OTHER PUBLICATIONS

PCT Search Report and Written Opinion dated May 11, 2018 for PCT Application No. PCT/US18/18827, 8 Pages.

*Primary Examiner* — Nirav G Patel
(74) *Attorney, Agent, or Firm* — Lee & Hayes, P.C.

(57) ABSTRACT

Type prediction method, apparatus and electronic device for recognizing an object in an image are disclosed. The method may include processing an image to be processed using a full image recognition technique to obtain a first type prediction result of an object in the image to be processed; processing a subject area of the image to be processed using a feature recognition technique to obtain a second type prediction result of an object of the subject area; determining whether the first type prediction result matches the second type prediction result; if the first type prediction result matches the second type prediction result, determining a type of the object of the image to be processed to be the first type prediction result or the second type prediction result.

18 Claims, 10 Drawing Sheets

(56) References Cited

U.S. PATENT DOCUMENTS

| | | |
|---|---|---|
| 2013/0286217 A1 | 10/2013 | Tsuji |
| 2014/0079326 A1 | 3/2014 | Ito et al. |
| 2015/0235110 A1 | 8/2015 | Curtis et al. |
| 2016/0162758 A1 | 6/2016 | Prest |
| 2016/0225286 A1 | 8/2016 | Dayal |
| 2016/0267359 A1 | 9/2016 | Gan et al. |
| 2016/0275363 A1 | 9/2016 | Matsuzaki |
| 2016/0307070 A1 | 10/2016 | Jiang et al. |
| 2017/0017862 A1 | 1/2017 | Konishi |
| 2017/0316277 A1 * | 11/2017 | Nobuoka ................. G06K 9/46 |

* cited by examiner

TYPE PREDICTION METHOD, APPARATUS AND ELECTRONIC DEVICE FOR RECOGNIZING AN OBJECT IN AN IMAGE

CROSS-REFERENCE TO RELATED PATENT APPLICATIONS

This application claims foreign priority to Chinese Patent Application No. 201710089723.7, filed on Feb. 20, 2017, entitled "Type Prediction Method, Apparatus and Electronic Device for Recognizing an Object in an Image," which is hereby incorporated by reference in its entirety.

TECHNICAL FIELD

This application belongs to the technical field of image recognition processing, more particularly, to type prediction methods, apparatuses and electronic devices for recognizing an object in an image.

BACKGROUND

With the development of network technology, users can not only perform searches by keywords but also perform searches by way of images. In the context of searching through images, a user can choose from a gallery of instant photos and upload them to a system. After obtaining an image uploaded by a user, the system may perform analysis of the image, identify objects in the image (people or objects, etc.) to determine type information of the image, and perform a search according to the type information and feature information of the image, and return a search result to the user.

Currently, there are two main ways of identifying items in an image to predict a type of the image. One way is to identify objects in a picture based on full image feature data and to output a classification label. Another way is to use an object detection technology to determine a subject area of an image, to identify object(s) in the subject area, to use a classification label of an object in the subject area as a type of the full image that is recognized. A process of identification based on full image feature data includes extracting visual features of an image to be processed, such as Histogram of Oriented Gradient (HOG) features, Scale-invariant feature transform (SIFT), etc. A system then generates a classification label of the image to be processed through a corresponding classifier such as SVM (Support Vector Machine). A process of identification based on an object detection technology may include the following operations analyzing a full image for subject area to determine the subject area of the full image, extracting corresponding characteristics of the subject area, and determining a classification label of the subject area according to the characteristics of the subject area.

However, the above method for recognizing objects in an image to predict a type of the image has the following problems: (1) For methods based on processing of full image feature data, due to an analysis of a full image, the system inevitably introduces background information, which will interfere with the recognition of a target object in the image, leading to a lower accuracy of a full image classification result. In particular, when the target object occupies a small proportion of the entire area, the introduction of background information has a greater impact on forecasting results. (2) Among processing methods based on a subject area, the system only analyzes a subject area of an image and identifies items in the main area, etc. Since an object area does not usually contain scene information and context information of the image, when A-shaped, a color and other characteristics of a target subject in a subject region are relatively similar, a classification label of the target subject in a subject area cannot be accurately predicted. Moreover, a certain false detection rate exists in an algorithm for detecting a subject area. Methods based on analyzing an area will introduce a loss of this part into type prediction results, and further reduce the accuracy of prediction of a type of object in an image.

SUMMARY

Implementations herein relate to type prediction methods, apparatuses and electronic devices for recognizing an object in an image. Combining a full image method and a subject area detection method, the implementations can identify an object in an image more accurately such that a type prediction result of the object in the image is more accurate, and the accuracy of a type prediction of the object during image recognition is improved.

The type prediction methods, apparatuses, and electronic devices for recognizing an object in an image are described herein.

Implementations relate to a type prediction method of recognizing an object in an image. The method may include processing an image to be processed using a full image recognition technique and obtaining a first type prediction result of an object in the image to be processed, the full image recognition technique recognizing the object in the image based on full image feature data; processing a subject area of the image to be processed using a feature recognition technique, obtaining a second type prediction result of an object of the subject area, the feature recognition technique recognizing the object in the image based on feature data of the object of the subject area; determining whether the first type prediction result matches the second type prediction result; if the first type prediction result matches the second type prediction result, determining a type of the object of the image to be processed to be the first type prediction result or the second type prediction result.

Implementations relate to a type prediction method of recognizing an object in an image. The method may include processing an image to be processed using a full image recognition technique, obtaining full image feature data of the image to be processed, the full image recognition technique recognizing an object in the image based on the full image feature data; processing a subject area of the image to be processed using a feature recognition technique, obtaining subject feature data of the subject area, the feature recognition technique recognizing the object in the image based on feature data of an object of the subject area; performing feature data combination on the full image feature data and the subject feature data using a predetermined method, obtaining combined feature data; recognizing the object in the image to be processed using the combined feature data, and determining a type of the object of the image to be processed.

Implementations relate to a type prediction apparatus for recognizing an object in an image. The apparatus may include a first recognition module configured to process an image to be processed using a full image recognition technique, obtain a first type prediction result of an object in the image to be processed, the full image recognition technique recognizing the object in the image using full image feature data; a second recognition module configured to process a subject area of the image to be processed using a feature recognition technique, obtain a second type prediction result of the object of the subject area, the feature recognition technique recognize the object of the image using feature data of the object of the subject area; a result comparison module configured to determine whether the first type prediction result matches the second type prediction result; and a first output module configured to determine a type of the object of the image to be processed to be the first type prediction result or the second type prediction result if the first type prediction result matches the second type prediction result.

Implementations relate to a type prediction apparatus for recognizing an object in an image, and the device may include a full image feature acquisition module configured to process an image to be processed using a full image recognition technique, obtain full image feature data of the image to be processed, the full image recognition technique recognizing an object in the image using full image feature data; a main feature processing module configured to process a subject area of the image to be processed using a feature recognition technique, obtain subject feature data of the subject area, the feature recognition technique recognizing the object of the image using feature data of the subject area; a combination processing module configured to perform feature data combination on the full image feature data and the subject feature data using a predetermined method to obtain combined feature data; and a classification processing module configured to recognize the object in the image to be processed using the combined feature data and determine a type of the object of the image to be processed.

Implementations relate to an electronic device, which may include processor(s) and memory for storing processor-executable instructions. The processor(s) execute(s) the instructions to implement acts including: processing an image to be processed using a full image recognition technique and obtaining a first type prediction result of an object in the image to be processed, the full image recognition technique recognizing the object in the image based on full image feature data; processing a subject area of the image to be processed using a feature recognition technique, obtaining a second type prediction result of an object of the subject area, the feature recognition technique recognizing the object in the image based on feature data of the object of the subject area; determining whether the first type prediction result matches the second type prediction result; if the first type prediction result matches the second type prediction result, determining a type of the object of the image to be processed to be the first type prediction result or the second type prediction result.

Implementations relate to an electronic device, including processor(s) and memory for storing processor-executable instructions. The processor(s) execute(s) the instructions to implement acts including processing an image to be processed using a full image recognition technique, obtaining full image feature data of the image to be processed, the full image recognition technique recognizing an object in the image based on the full image feature data; processing a subject area of the image to be processed using a feature recognition technique, obtaining subject feature data of the subject area, the feature recognition technique recognizing the object in the image based on feature data of an object of the subject area; performing feature data combination on the full image feature data and the subject feature data using a predetermined method, obtaining combined feature data; recognizing the object in the image to be processed using the combined feature data, and determining a type of the object of the image to be processed.

Implementations relate to a computer-readable storage medium, storing computer instructions, and the computer instructions when executed implement operations including processing an image to be processed using a full image recognition technique and obtaining a first type prediction result of an object in the image to be processed, the full image recognition technique recognizing the object in the image based on full image feature data; processing a subject area of the image to be processed using a feature recognition technique, obtaining a second type prediction result of an object of the subject area, the feature recognition technique recognizing the object in the image based on feature data of the object of the subject area; determining whether the first type prediction result matches the second type prediction result; if the first type prediction result matches the second type prediction result, determining a type of the object of the image to be processed to be the first type prediction result or the second type prediction result.

Implementations relate to a computer-readable storage medium, storing computer instructions, and the computer instructions when executed implement operations including processing an image to be processed using a full image recognition technique, obtaining full image feature data of the image to be processed, the full image recognition technique recognizing an object in the image based on the full image feature data; processing a subject area of the image to be processed using a feature recognition technique, obtaining subject feature data of the subject area, the feature recognition technique recognizing the object in the image based on feature data of an object of the subject area; performing feature data combination on the full image feature data and the subject feature data using a predetermined method, obtaining combined feature data; recognizing the object in the image to be processed using the combined feature data, and determining a type of the object of the image to be processed.

The type prediction methods, apparatuses, and electronic devices for recognizing an object in an image are implemented by using two different type prediction methods on the object in the image to obtain corresponding type prediction results. The type prediction methods may include a method of object recognition based on full image feature data of the image and a method of object recognition based on feature data of a subject area of the image. The type prediction results may then be compared. If the results match each other, a type of the object of the image to be processed may be determined to be one of the results. The method based on full image feature data has a higher recognition rate in object recognition, while the method based on subject area has a higher accuracy in identifying real object(s) in an image to be processed. The implementations of the present disclosure combine features of these two methods to obtain a subject meeting a predetermined condition and accurately identify what the subject is. The implementations not only reduce background interference but also solve problems such as information loss and false detection rates. The implementations further improve the accuracy and the reliability of type prediction of object(s) recognized in an image, making a prediction result of object type(s) in the image more accurate, and improving the precision and reliability of the type prediction of the object(s) recognized in the image.

This Summary is not intended to identify all key features or essential features of the claimed subject matter, nor is it intended to be used alone as an aid in determining the scope of the claimed subject matter.

BRIEF DESCRIPTION OF THE DRAWINGS

The detailed description is described with reference to the accompanying figures. Apparently, the described figures are merely part of implementations of the present disclosure. Those skilled in the art should understand that other figures may be obtained in accordance with the implementations of the present disclosure without making any further creative labor.

DETAILED DESCRIPTION

In order to enable those skilled in the art to understand technical solutions of the application in a better method, a detailed description is provided hereinafter in conjunction with accompanying drawings. The implementations of the present disclosure are described in detail herein in conjunction with the accompanying drawings. Apparently, the described embodiments are merely part but not all of embodiments of the present application. Based on the implementations of the present disclosure, all other implementations, when obtained by those of ordinary skill in the art with making any creative effort, should fall within the scope of protection of the present disclosure.

Figure 1:
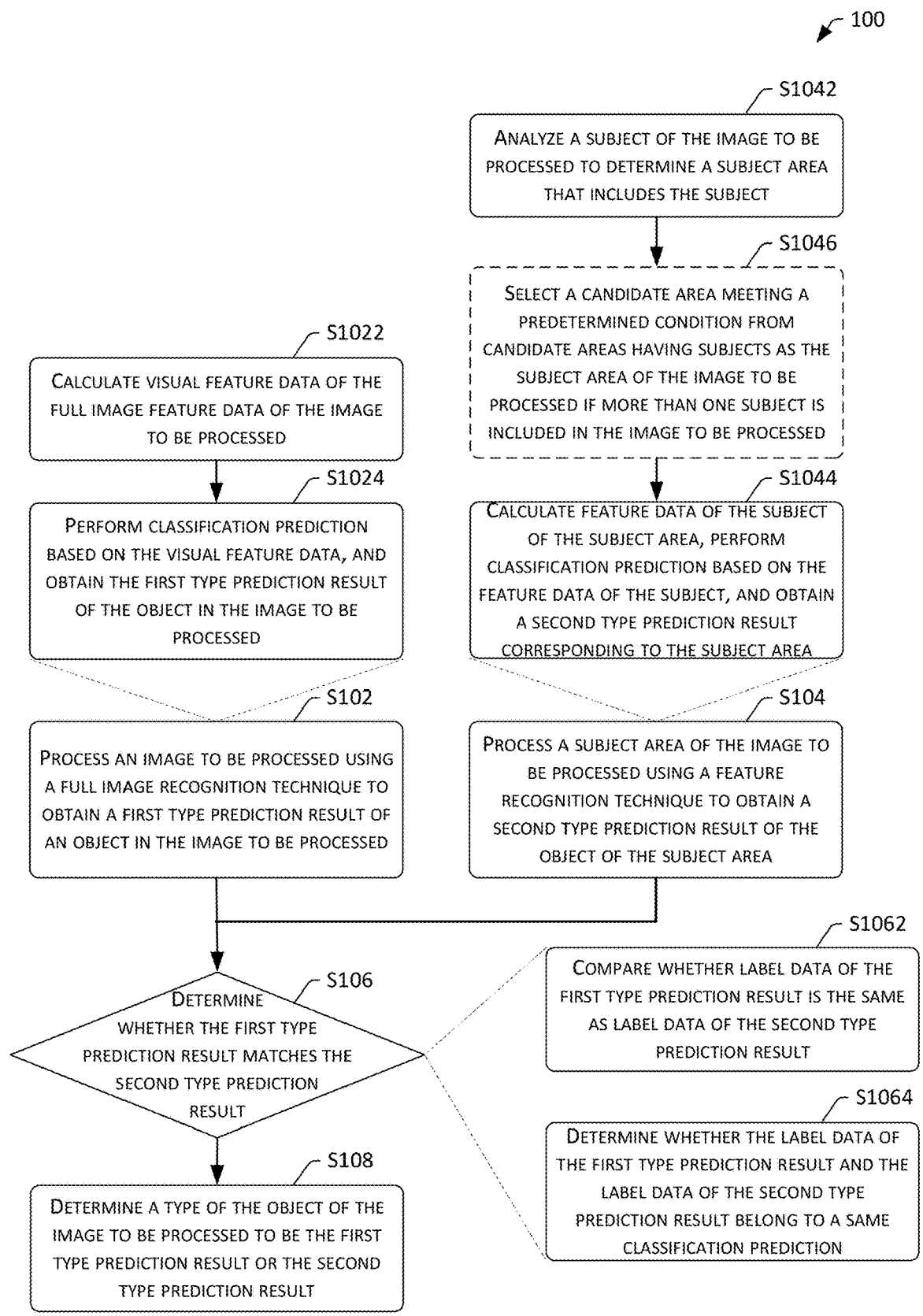
FIG. 1 is a flowchart illustrating an implementation of a type prediction method of recognizing an object in an image described by the present application.

FIG. 1 is a flowchart illustrating an implementation of a type prediction method 100 of recognizing an object in an image described by the present application. Although the present application provides method operations or apparatus structures as shown in the following implementations or the accompanying drawings, conventional or non-inventive labor may include more or less combined operations, modular units in the methods or apparatuses. The operations or structures do not logically have any necessary causal relationships, and orders of execution of these operations or module structures of the apparatuses are not limited to execution orders or module structures shown in the implementations or drawings of the present application. When a device or a terminal of the method or module structure is used, sequential or parallel execution (e.g., parallel processor or multithreaded environment and even distributed process execution environment) may be performed sequentially according to the method or module structure shown in the implementations or the accompanying drawings.

The image described in this application may include a computer-rendered image, and may also include a manually generated image (including a picture) generated by an external scene that is captured by an external device, such as a captured image taken by a mobile terminal. The image may be a static vector or non-vector picture or may include a two-dimensionally arranged pixel image, such as BMP, PCX format image. The implementations herein are implemented by using two different type prediction methods on an object in an image to obtain corresponding type prediction results. The type prediction methods may include a method of object recognition based on full image feature data of an image and a method of object recognition based on feature data of a subject area of the image. The type prediction results may be then compared. If the results match each other, a recognition result of the image to be processed may be directly outputted. In implementations, as shown in FIG. 1, the present application provides an implementation relating to a type prediction method 100 of recognizing an object in an image. The method 100 may include the following operations.

At S102, a computing device may process an image to be processed using a full image recognition technique, and obtain a first type prediction result of an object in the image to be processed, the full image recognition technique recognizing the object in the image based on full image feature data.

The full image recognition technique recognizes object(s) in an image based on full image feature data. An entire image of an image to be processed is usually taken as an input, and an output layer of a classifier or a neural network obtains a processing method of a classification of the entire image of the image to be processed. In this case, a type to which the image to be processed belongs may be understood as an object identified from the image to be processed. The object can be a dominant item in the image (which is visible to the human eye), or scene information that the entire image is to be expressed. In an application scenario in which an object in an image to be processed needs to be identified, the object described in this implementation may be understood as an object to be represented by calculated data of the image to be processed. For example, in a scene that an item in an image to be processed is identified, the object may be an item appearing in the image to be processed, such as a coat, or a hat, or a boat. Accordingly, a correspondingly first type prediction result that is obtained may be a coat (or a hat, or a boat). A terminal application may recommend and display products of a coat type to a user. In implementations, this application does not exclude the following scenarios. Under different identification needs of objects in an image to be processed (processing logic or classification rules in different recognition scenarios may be set, etc.) results of the objects identified in the same image may be different. For example, a recognition result can be a "River Snow" poetry and picture for an appearance of the coat, hat, and boat in the same image. In this case, the terminal application may recommend products related to the ancient poetry and calligraphy to the user.

In this implementation, a method of full image recognition may be pre-selected, to process the image to be processed to obtain a predicted object result to which the image to be processed belongs using a type prediction method based on full image feature data of type prediction (i.e., a first type prediction result).

In an implementation, the full image recognition method may use feature data of an image visual perception such as color (grayscale, HSV, RGB), texture, shape and other data for processing to identify the object of the image to be processed based on featured data of the image visual perception. In another implementation, processing the image to be processed using the full image recognition technique and obtaining the first type prediction result of the object in the image to be processed may include the following operations.

At S1022, the computing device may calculate visual feature data of the full image feature data of the image to be processed.

At S1024, the computing device may perform classification prediction based on the visual feature data, and obtain the first type prediction result of the object in the image to be processed. The visual feature data may refer to, such as, color (grayscale, HSV, RGB), texture, shape and other data of the image to be processed, which may represent the image itself for subsequent analysis and processing. The specific visual feature data may include data obtained by a method such as Histogram of Oriented Gradient (HOG), Scale-invariant feature transform (SIFT) and other algorithms to obtain the feature data, or CNN (Convolutional neural networks, convolutional neural network), or other feature data obtained by deep learning. HSV (Hue Saturation Value) refers to a color model, and is also known as hexagon model (Hexcone Model) of which parameters include Hue (H), Saturation (S), and Lightness (V). RGB is a color standard in the industry, and a wide range of colors may be obtained through changes in red (R), green (G), blue (B) three color channels and their superposition. RGB represents three channels of red, green and blue.

Then the visual feature data of the obtained full image can be used for classification prediction, to output a prediction result. For example, the visual feature data may be used as input data of a convolutional neural network. After processing by each convolution layer, a SoftMax layer may output label data of a type of the image to be processed. A specific layer structure of the convolution neural network, a selection of a convolution kernel, and classification rules of SoftMax layer, etc. may be configured according to an actual scene of image processing, and may be trained, and undergone parameter feedback and revisions using a predetermined number of samples. The implementations may identify items represented by the image to be processed or objects of other types more accurately based on visual feature data of the full image and may output a classification label (label data) to which the recognized object belongs.

The visual feature data and the subsequently described main feature data, etc., may be a vector data format, for example, N-dimensional vector feature data.

At S104, the computing device may process a subject area of the image to be processed using a feature recognition technique, and obtain a second type prediction result of an object of the subject area, the feature recognition technique recognizing the object of the image based on feature data of the object of the subject area.

The feature recognition of the implementations of the present application may be implemented using the feature data of the object of the subject area to recognize objects of images. The main process generally involves determining a subject area having a subject in the image to be processed, them performing classification prediction based on the subject data, identifying an object in the subject area, determining label data of the object identified in the subject area, and obtaining a second type prediction result. In implementations, the subject area of the image to be processed may be directly obtained (for example, only one subject is included in the image). In other implementations, a computing device may identify candidate areas that may include a subject (such as obtaining the candidate areas by using a Selective Search Algorithm, RPN algorithm, or the like), determine the subject area meeting a condition from the candidate areas using a designed screening or matching method. The main area is then classified and predicted (for example, a classification label corresponding to a candidate area is obtained by using the HOG/SIFT+SVM algorithm), and a type prediction result corresponding to the subject area (which is referred to as a second type prediction result for the sake of description) is obtained.

The recognition of a subject in the image may be related to needs of identifying specific content, such as recognizing human facial features, bags, clothes, brand in the image, which is usually based on some prior knowledge (or hypothesis) of the content of the image. In another implementation, processing the subject area of the image to be processed using the feature recognition technique and obtaining the second type prediction result of the object of the subject area may include the following operations.

At S1042, the computing device may analyze a subject of the image to be processed to determine a subject area that includes the subject.

At S1044, the computing device may calculate feature data of the subject of the subject area, perform classification prediction based on the feature data of the subject, and obtain a second type prediction result corresponding to the subject area.

After obtaining the image to be processed, the computing device may implement relevant candidate area detection algorithms (e.g., Selective Search Algorithm, RPN (Region Proposal Network) algorithms, and other algorithms) to process the image be processed, to determine the subject area containing the object in the image to be processed. Then, the computing device may calculate subject feature data of the subject area. The subject feature data may be color data, or other types of image data. In general, which feature data of the subject area is calculated may be determined by a detection method that is selected for the subject area. Then, the subject feature data may be used for prediction and recognition of the object in the image to be processed. For example, the object in the subject area may be identified using a HOG/SIFT+SVM network, and the computing device may output a classification label (label data) to which the object in the subject area belongs. The Selective Search Algorithm and RPN algorithm mentioned in the implementations of the present application are merely for illustration purpose. Detection algorithms for the subject area in other implementations of the present application are not limited thereto. In implementations, details of detection of a subject and an implementation process of identifying and predicting feature data of the subject may further include other processes according to a selected algorithm, such as regressing and modifying a subject area.

In another implementation, the image to be processed may include more than one subject. For example, three subjects including fruits, clothes, and knives may be included in the image to be processed. In this case, one of the multiple candidate areas may be selected as the subject area. For example, a candidate area with the largest number of pixel points among the multiple candidate areas may be selected as the subject area of the image to be processed.

Alternatively, a candidate area that is closest to a position of a center point of the image to be processed may be selected as the subject area. Accordingly, in another implementation, in response to a determination that the image to be processed includes more than two subjects, determining the subject area of the subject may include the following operations.

At S1046, the computing device may select a candidate area meeting a predetermined condition from candidate areas having subjects as the subject area of the image to be processed. The candidate area is an image area having a subject of the image to be processed.

In a specific example, after multiple candidate areas (A1, A2, A3) having subjects are obtained, the computing device may determine a respective ratio K between each candidate area and the image area to be processed, and a respective Euclidean distance D from a pixel at the center of the image to be processed. The computing device may then calculate a sum thereof using a weight of 50% for each of the two values according to the respective ratio of each candidate region K and the respective Euclidean distance D, and designate a candidate area having the largest value as a resulting subject area of the image to be processed. Alternatively, in another implementation, when the image to be processed includes more than one subject, the computing device may separately calculate probabilities of corresponding candidate areas containing subjects, sort the corresponding candidate areas according to the probabilities, and designate a candidate area with the highest probability value as the subject area.

The computing device may usually obtain a candidate area by extracting feature data of the image to be processed, and then use a target subject detection method to identify a subject in the image to be processed and determine a region scope including subject pixels within a pixel range of the image to be processed. General, the region scope including the subject may be rectangular. In an implementation, a candidate area may be identified as follows: analyzing an image to be processed using a selected subject analysis technique, and recognizing a subject included the image to be processed; determining a region scope of the subject based on coordinate information of boundary pixels of the recognized subject; and selecting the region scope as a candidate area.

In other implementations, a candidate area including a subject may be obtained from a target subject analysis technique of some images (e.g., RPN algorithm). Therefore, network control parameters may be set or adjusted via the target subject analysis technique, to obtain different candidate areas.

At S106, the computing device may determine whether the first type prediction result matches the second type prediction result.

After the first type prediction result and the second type prediction result are obtained in the two methods described above, the computing device may determine whether these type prediction results match with each other. For example, the computing device may determine whether string information (for example, a classification label to which an object belongs) of the first type prediction result and the second type prediction result is the same, or whether classification labels in a database corresponding to the first type prediction result and the second type prediction result are the same. Whether the type prediction results are matched can be set to include whether type prediction result data thereof is the same, whether the type prediction results are similar, or whether the type prediction results satisfy a certainly predetermined correspondence relationship. In practical applications, matching conditions and comparison methods of the first type prediction result and the second type prediction result may be set according to the scenario requirements or data processing requirements.

In implementations, although the first type prediction result and the second type prediction result are different by direct comparison (e.g., due to conditions that the previous classification rules are not perfect or classification labels outputted by the two classification methods for a same object are inconsistent), a degree of similarity between the two is very high, or they belong to the same type after they are unified into a same classification rule. In this case, these two type predictions may be regarded as the same in an implementation to meet the needs of some scenarios, to facilitate user-friendly management and image classification. Accordingly, in another implementation, determining whether the first type prediction result matches the second type prediction result may include the following operations.

At S1062, the computing device may compare whether label data of the first type prediction result is the same as label data of the second type prediction result, and determine that the first type prediction result matches the second type prediction result if the label data of the first type prediction result is the same as label data of the second type prediction result.

Alternatively, at S1064, the computing device may determine whether the label data of the first type prediction result and the label data of the second type prediction result belong to a same classification prediction, and determine that the first type prediction result matches the second type prediction result if affirmative.

In general, when performing image recognition, output results of a commonly used algorithm or network model is a classification label, which indicates a name or type of an item in an image to be processed, such as "coat" or "jacket." Accordingly, in implementations, the comparison between the first type prediction result and the second type prediction result may be implemented by comparing whether respective label data are the same. Details of an implementation process may include comparing strings of the first type prediction result and the second type prediction result (such as classification labels including alphanumeric characters). If the strings are exactly the same, this indicates that the first type prediction result matches the second type prediction result. In implementations, this application does not exclude using an algorithm to convert the first type prediction result and the second type prediction result into corresponding values (e.g., numeric values and characters) and then to compare whether they are the same in some other embodiments.

The preset classification may be designed and stored in advance according to design requirements or application scenarios, for example, a preset classification table that stores various item types in a database. The label data of the first type prediction result and the label data of the second type prediction result may then be compared to determine whether they correspond to the same object classification in the preset classification table. In a specific example, the first type prediction result is "windbreaker" via a full image recognition technique, and the second type of prediction obtained is "long coat" via a feature recognition technique. These two perditions results belong to the type of "coat" based on a predetermined product classification. Accordingly, a determination can be made that the first type of prediction matches the second type of prediction. The computing device may recommend to users TOPN "Coat" product information in the preset classification table.

At S108, the computing device may determine a type of the object in the image to be processed to be the first type prediction result or the second type prediction result if the first type prediction result matches the second type prediction result.

In the present implementation, if the prediction results that are outputted by the two image classification processes are the same, this indicates that the type prediction method based on the full image feature data and he type prediction method based on the subject feature data both accurately predict a real object in the image to be processed. At this time, the computing device may directly output a recognition result of the image to be processed. As the results of the two-classification methods match, a final recognition result may be the first type prediction result or the second type prediction result. Thus, the implementations provide accurate classification labels for the subsequent classification processes (e.g., a product search), and provide an accurate data basis for other processes.

The implementations of the present application are specifically applied to a scenario of identifying an item in an image. After obtaining an image to be processed, a computing device may acquire first label data that identifies an object in the image to be processed using full image feature data, detect a subject of the image to be processed to obtain a subject area of the image to be processed, and then identify an object in the subject area to obtain second label data corresponding to the subject area. The computing device may then compare the first label data and the second label data to determine whether they are the same. If the first label data and the second label data are the same, the computing device may use either the first label data or the second label data as a recognition result for the image to be processed. The computing device may output a classification label number of the object in the image to be processed. Thus, the implementations make recognition results of objects in images more accurate, and effectively improve the accuracy of object recognition in images to be processed.

For example, a target subject 1 is included in an image to be processed P1. Label data of the image to be processed that is obtained is assumed to be "fruit" using a type prediction method of recognizing an object in an image to be processed based on full image feature data. Label data corresponding to the subject 1 in the image to be processed P1 obtained by a type prediction method of recognizing an object in an image to be processed based on subject feature data is assumed to be "fruit." By comparison, the computing device may determine that output results of these two classification methods are consistent, and further determine that a type of the object in the image be processed P1 is "fruit."

The present application provides a type prediction method for recognizing an object in an image, which may be implemented by using two different methods for predicting a type of an object in an image to obtain corresponding type prediction results. The type prediction methods may include a method of object recognition based on full image feature data of the image and a method of object recognition based on feature data of a subject area of the image. The type prediction results may be then compared by a computing device. If the results match with each other, the computing device may output a recognition result of the image to be processed. The implementations of the present disclosure consider the interference of background noise in a classification of a full image, an information loss and false detection rates of a main area detection, and combine a processing method based on full image feature data having higher recognition rates of identifying objects with a processing method based on a subject feature data having higher accurate rates of identifying real subjects of an image to be processed. The implementations further improve the accuracy and the reliability of type recognition of an object in an image that is recognized, make a prediction of a type of the object in the image more accurate, and improve the accuracy and reliability of the type prediction of the object in the image that is recognized.

In the foregoing implementations, a situation in which multiple subjects are included in an image to be processed may exist. For example, items in the image to be processed are, for example, a coat, a hat, a boat. In an implementation of the present application, one of the candidate areas that include an object may be selected as a subject area that is outputted when an object detection process is performed. In another processing method provided by the present application, object recognition may be performed on multiple identified subject areas to obtain corresponding second type prediction results respectively, and a second type prediction result that matches a first type prediction result obtained by using full image feature data may then be selected from among the second type prediction results. In another implementation, in response to a determination that the image to be processed includes more than two subjects, subject areas of subjects are individually determined to obtain second type prediction results corresponding to the subject areas.

Correspondingly, determining whether the first type prediction result matches the second type prediction result may include determining whether the second type prediction results include a second type prediction result matching the first type prediction result; and determining that a determination result is a match if affirmative.

Correspondingly, the second type prediction result matching the first type prediction result is designated as the type of the object of the image to be processed.

In this way, when the image to be processed contains multiple objects, the computing device may select an output result that is the same as a result of a data acquisition using the full image data as an output result of the image to be processed. The processing method based on full image feature data has a higher recognition rate of identifying objects, and the processing method based on subject feature data has a higher accurate rate of identifying real subjects of images to be processed. The implementations further improve the accuracy and reliability of results of object recognition.

Figure 2:
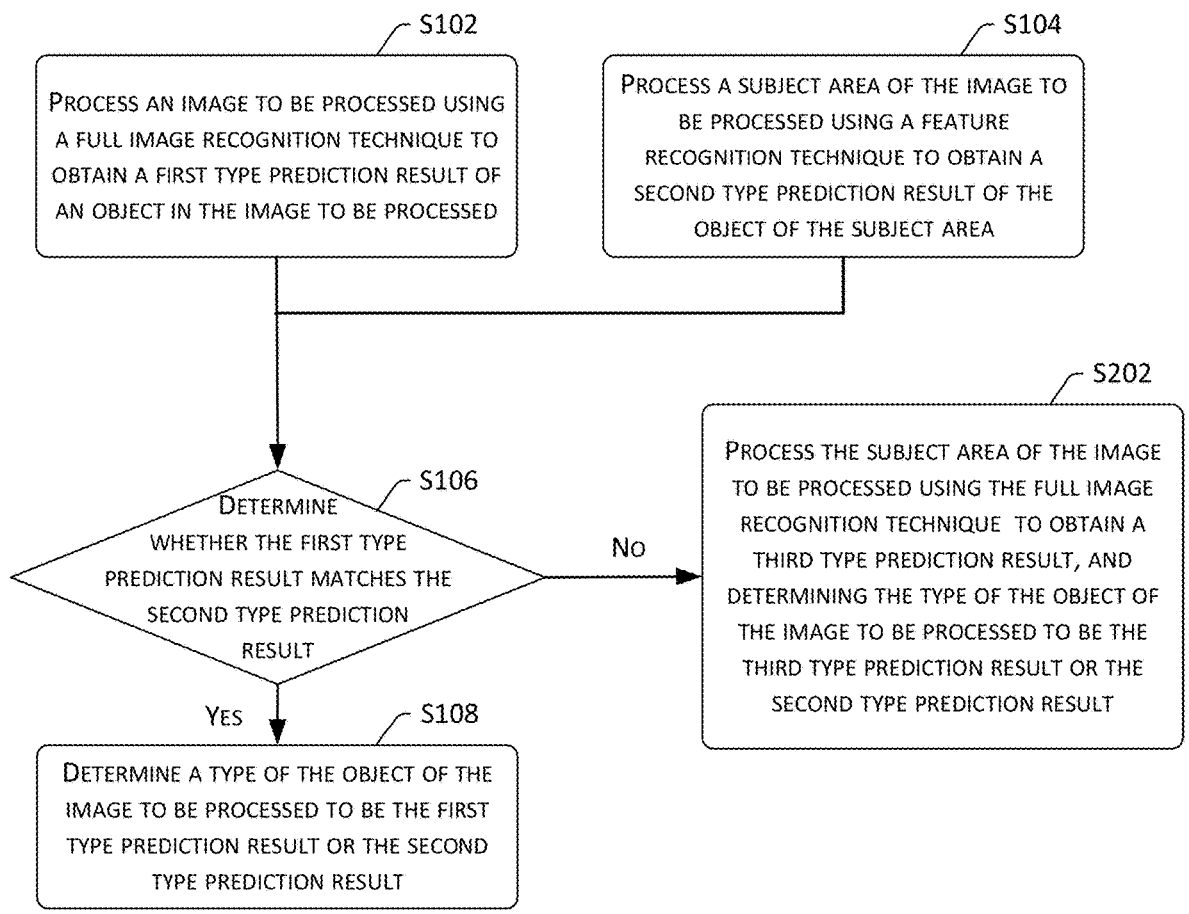
FIG. 2 is a flowchart illustrating an implementation of another type prediction method of recognizing an object in an image described by the present application.

The foregoing embodiments describe implementations for situations in which prediction results of two object prediction methods are the same. Other embodiments of the present application further provide processing methods when a first type prediction result is different from a second type prediction result. In situations when prediction results are inconsistent, a subject area of an image to be processed may be used as a new full image, which is re-used by a type-prediction method 200 of recognizing an object in the image to be processed based on full image feature data to process the subject area of the image to be processed. As illustrated in FIG. 2, the method 200 may further include the following operations.

At S202, the computing device may process the subject area of the image to be processed using the full image recognition technique associated with the object in the image, and obtain a third type of prediction result of the object in the subject area, if the first type prediction result does not match the second type prediction result. The computing device may determine that the third type of prediction result is the type of the object of the image to be processed.

In implementations, if the first type prediction result does not match the second type prediction result (for example, not belonging to a same classification result), the subject area obtained by the foregoing method for detecting the subject area may be further used as an input of the full image feature data of the type prediction method of recognizing the object in the image to be processed. The computing device may then perform the object recognition processing again according to the full image feature data and the type prediction method of recognizing the object in the image to be processed to obtain a new second type prediction result (referred to herein as a third prediction result). At this time, the third prediction result for the object may be used as an object recognition result of the image to be processed. In implementations, when the recognition results obtained by the above two methods are not consistent or the same, the method based on the subject area has a higher accuracy in identifying real objects in images to be processed. Accordingly, in this implementation, the identified subject area may be treated as a new object to be processed. And the computing device may then perform the object recognition processing according to the full image feature data and the type prediction method of recognizing the object in the image to be processed to determining the type of the object of the image to be processed. The method based on the full image feature data has a higher recognition rate in objection recognition. In this way, in cases of inconsistent prediction results, the implementations improve the accuracy and reliability of recognition and prediction of types of objects in images, and improve the accuracy of image classification by combining the advantages of the two methods.

Figure 10:
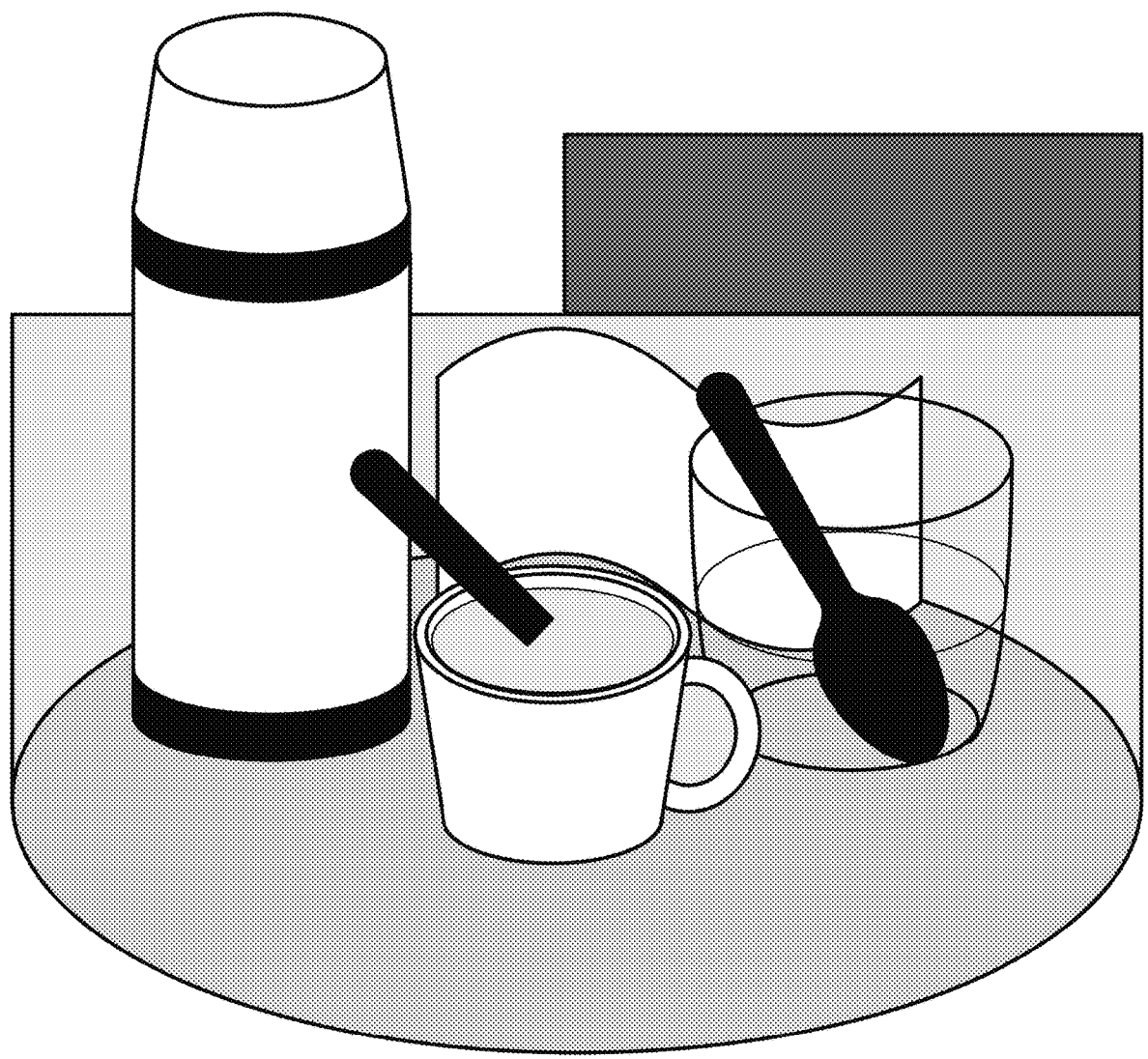
FIG. 10 is a schematic diagram of an image to be processed of an implementation of the present application.

In a specific example, as shown in FIG. 10, a user captures and obtains a picture P1 through a terminal. The picture P1 is assumed to include a plurality of objects, such as a kettle, an A-shaped coffee cup and a B-shaped glass cup. The user intends to inquire about or search for information related to the A-shaped coffee cup. Background interference in P1 is relatively complicated, including interferences from other items (parts of a paper towel), a light intensity, and a color of a wall closer to the items. If existing conventional techniques are used, for example, a full image recognition process, a subject included in the image P1 may be identified as a kettle, a coffee cup, and a glass. However, due to interferences from the background, for example, coffee cups and baffles that are light yellow, and thus colors are closer. The glass cup is transparent and is very close to the desktop white. There is even interference from light yellow paper towels. However, an area occupied by a main area of the water bottle is the largest as compared with other items. Therefore, the kettle may eventually be outputted as a recognized subject, with the kettle as a finally identified item for presentation to a user. Alternatively, since the paper towels occupy the center of the image and have a larger area than the coffee cup, an item that may also be displayed to the user is paper towels. The recognition accuracy of existing full image recognition techniques for recognizing a main area in an image is low. However, as compared with the full image recognition, the subject detection method is generally able to identify a subject area P1_Obj containing the coffee cup which is an expected identification object, and detect the subject area that is consistent with the user's intent. However, in the current method of detecting an object using a subject of an image to be processed, the accuracy of a recognition result of a type of the object is relatively low. A result returned to the user may be the A-shaped coffee cup when object detection is performed in the subject area. Although being similar to the A-shaped, the result likely fails to meet the expectation of the user. Even worse, although a location of an subject area that the user desires to be identified is found, an identification result may be different from the expectation of the user, and an error in identification (e.g., identifying a coffee cup as a glass with a handle) may even occur. After adopting the method of the present implementation, if the results obtained by using two methods are the same, i.e., showing A-shaped of the coffee cup, this means that both methods correctly identify the objects in the image under an application scenario. If they are inconsistent, the subject area P1_Obj obtained by the foregoing method for detecting the subject area may be further used as an input image for the type prediction method of recognizing an object in an image to be processed based on full image feature data. The image recognition is therefore performed again. Since the newly confirmed image P1_Obj contains the subject area of the correct cup and the method based on the full image feature data has a higher recognition rate in object recognition, a combination of the two methods can output related query or search information of A-shaped coffee cup to the user with a higher probability, as compared to processing using each of the two methods individually. In this way, the implementations improve the accuracy of the type prediction of the object to meet user needs, and to improve the user experience.

Figure 3:
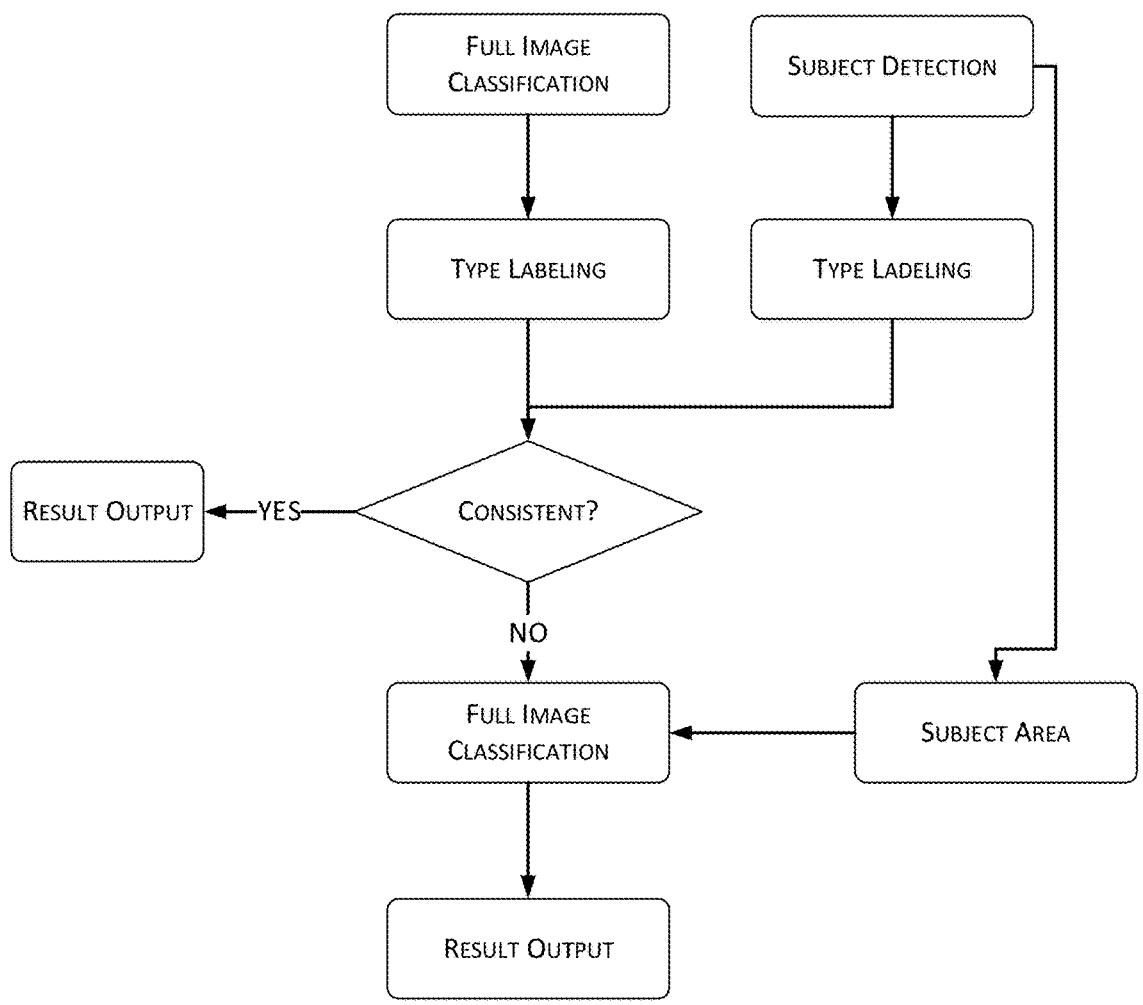
FIG. 3 is a flowchart illustrating an implementation of a specific method provided by the present application.

FIG. 3 is a flowchart illustrating an implementation of a specific method 300 provided by the present application. In FIG. 3, details of operations include: (1) inputting a full image of an image to be processed as input data to predict a classification label using a classification model; (2) performing a subject detection on the image to be processed to obtain a subject area and a corresponding classification label; (3) performing a check on the labels that are outputted in (1) and (2), and directly outputting a detection result if the labels are the same, or using the subject area that is obtained from (2) as an input and performing (1) again for classification to obtain a final output otherwise.

As can be seen from the above implementations and the example in FIG. 3, the present application provides a type prediction method for recognizing an object in an image, which can be implemented by using two different type prediction methods on the object in the image to obtain corresponding type prediction results. The type prediction methods may include a method of object recognition based on full image feature data of the image and a method of object recognition based on feature data of a subject area of the image. The type prediction results may be then compared by a computing device. If the results are the same, the computing device may output a recognition result of the image to be processed. The implementations of the present disclosure consider the interference of background noise in the classification of the full image, the information loss and false detection rates of the main area detection, and combine the processing method based on the full image feature data having a higher recognition rate of identifying objects and the processing method based on the subject feature data having a higher accurate rate of identifying real subjects of the image to be processed. The implementations further improve the accuracy and reliability of a type of a recognized object in an image, and make a prediction result of the type of the object in the image more accurate.

Figure 4:
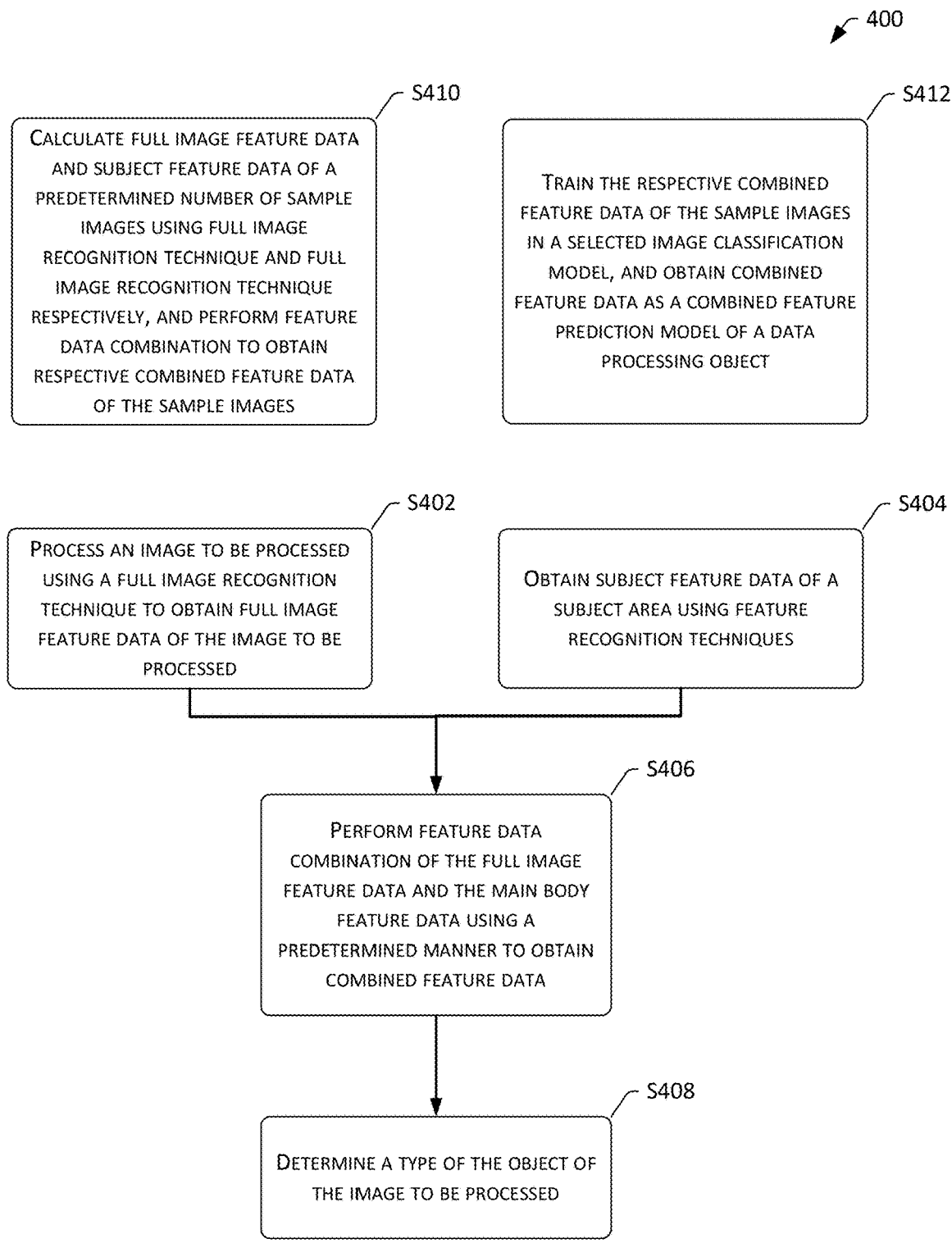
FIG. 4 is a flowchart illustrating another implementation of a type prediction method of recognizing an object in an image provided by the present application.

According to the ideas of identifying objects in an image to be processed based on two different image processing techniques, the present application may also combine feature data acquired by the two methods that are separately based on a subject area and a full image, and classify the image using the combined feature data to obtain a type of an object in the image to be processed. The method based on feature data of a full image has a higher recognition rate in object recognition, and the method based on a subject area has a higher accuracy in identifying real objects in an image to be processed. Another method for identifying an object in an image to be processed provided in the present application can allow combined feature data to have characteristics of the two methods, to reduce the interference of background noise in a classification of a full image, while solving the problems of information losses and false detection rates of a subject area detection, thus optimizing an output and being able to effectively improve the accuracy of identifying items in the image. FIG. 4 is a flowchart illustrating another implementation of a type prediction method 400 of recognizing an object in an image provided by the present application. As illustrated in FIG. 4, in another implementation, the method 400 may include the following operations.

At S402, a computing device may process an image to be processed using a full image recognition technique to obtain full image feature data of the image to be processed, the full image recognition technique recognizing objects in images based on full image feature data.

At S404, the computing device may process a subject area of the image to be processed using a feature recognition technique to obtain subject feature data of the subject area, the feature recognition technique recognizing objects of images based on the feature data in the subject area.

At S406, the computing device may perform feature data combination on the full image feature data and the subject feature data using a predetermined method, and obtain combined feature data.

At S408, the computing device may recognize an object in the image to be processed using the combined feature data, and determine a type of the object in the image to be processed.

Details of an implementation of obtaining the full image feature data or the subject feature data may include using the HOG, SIFT or Deep Convolutional Neural Networks, Selective Search algorithm, and the like, as described in the foregoing implementations. The computing device may perform feature data combination on the full image feature data and the subject feature data using a predetermined method or using another predetermined feature data combination technique. For example, the full image feature data and the subject feature data may be directly spliced together.

Figure 5:
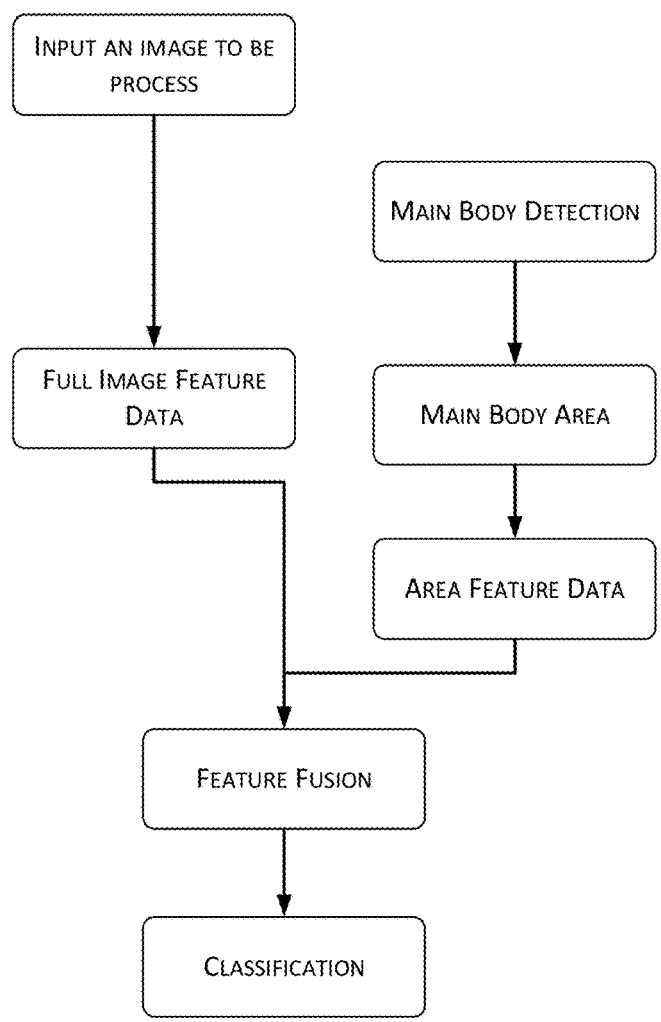
FIG. 5 is a flowchart illustrating another implementation of a specific method provided by the present application.

FIG. 5 is a flowchart illustrating an exemplary implementation of the method 500 provided by the present application. In the example of FIG. 5, a computing device may adopt a method of object recognition based on full image feature data of an image and a method of object recognition based on feature data of a subject area of an image to process an image to be processed. The computing device may obtain 28-dimensional full image feature data Data_All and 28-dimensional subject feature data Data_Sub. The computing device may then splice and combine the 28-dimensional full image feature data Data_All and the 28-dimensional subject feature data Data_Sub into a 56-dimensional combined feature data Data_Mix, and identify an object in the image to be processed based on the combined feature data Data_Mix to obtain a recognition result for the image to be processed. In this way, by combining feature data obtained by the two real image classification methods for object recognition, a classification process thereof can meet classification requirements of the two classification methods, such that type prediction results of an object in the image are more accurate.

In implementations, besides combining and splicing, feature data combination may also include other implementations. For example, 28-dimensional combined feature data Data_Mix may be obtained by adding data values of corresponding dimensions in the full image feature data Data_All and the 28-dimensional subject feature data Data_Sub. Details of an implementation of may be based on an algorithm or a customized processing method that is selected according to application scenario and design requirements.

The present application provides another implementation relating to a type prediction method of recognizing an object in an image. A combined feature prediction model using combined feature data for image recognition and prediction may be pre-configured. After obtaining combined feature data of an image to be processed, a computing device may directly input the combined feature data to the combined feature prediction model to identify an object in the image to be processed, and output an identification result. The combined feature classification model may be obtained by learning based on sample images in advance. Accordingly, the present application provides another implementation relating to a type prediction method of recognizing an object in an image, which employs combined feature data to recognize an object in an image to be processed and may include performing a classification prediction using a combined feature prediction model with combined feature data as an input, the combined feature prediction model being established by the following operations.

At S410, a computing device may calculate full image feature data and subject feature data of a predetermined number of sample images using full image recognition technique and full image recognition technique respectively, and perform feature data combination to obtain respective combined feature data of the sample images.

At S412, the computing device may train the respective combined feature data of the sample images in a selected image classification model, and obtain combined feature data as a combined feature prediction model of a data processing object.

A data processing model for training combined feature data may be selected according to an application scenario and data processing requirements of an image to be processed, such as SVM separators, deep convolution networks including SOFTMAX output layers, etc. In the present implementation, the combined feature prediction model for processing the fusion feature data may be generated by training locally or obtained based on a third-party combined feature prediction model. For example, a first terminal for recognizing an object in an image to be processed may adopt the two methods as described above to process the image to be processed and combine feature data to obtain combined feature data. The combined feature data may then be inputted into a combined feature prediction model that is obtained from a second terminal (or another supplier of data models), to output an object recognition result of the image to be processed.

The present application provides a type prediction method for recognizing an object in an image, which may be implemented by using two different type prediction methods on an object in an image to obtain corresponding type prediction results. The type prediction methods may include a method of object recognition based on full image feature data of an image and a method of object recognition based on feature data of a subject area of the image. The type prediction results may be then compared by a computing device. If the results match each other, the computing device may determine a type of an object of the image to be processed to be one of the results. The method based on the full image feature data has a higher recognition rate in object recognition, while the method based on the subject area has a higher accuracy in identifying real objects in the image to be processed. The implementations of the present disclosure combine the features of these two methods to obtain a subject meeting a predetermined condition and accurately identify what the subject is. The implementations not only reduce background interference but also solve problems such as information loss and false detection rates. The implementations further improve the accuracy and reliability of a type of a recognized object in an image, making a type prediction of the object in the image more accurate, and improving the accuracy and reliability of type prediction of the recognized object in the image.

Figure 6:
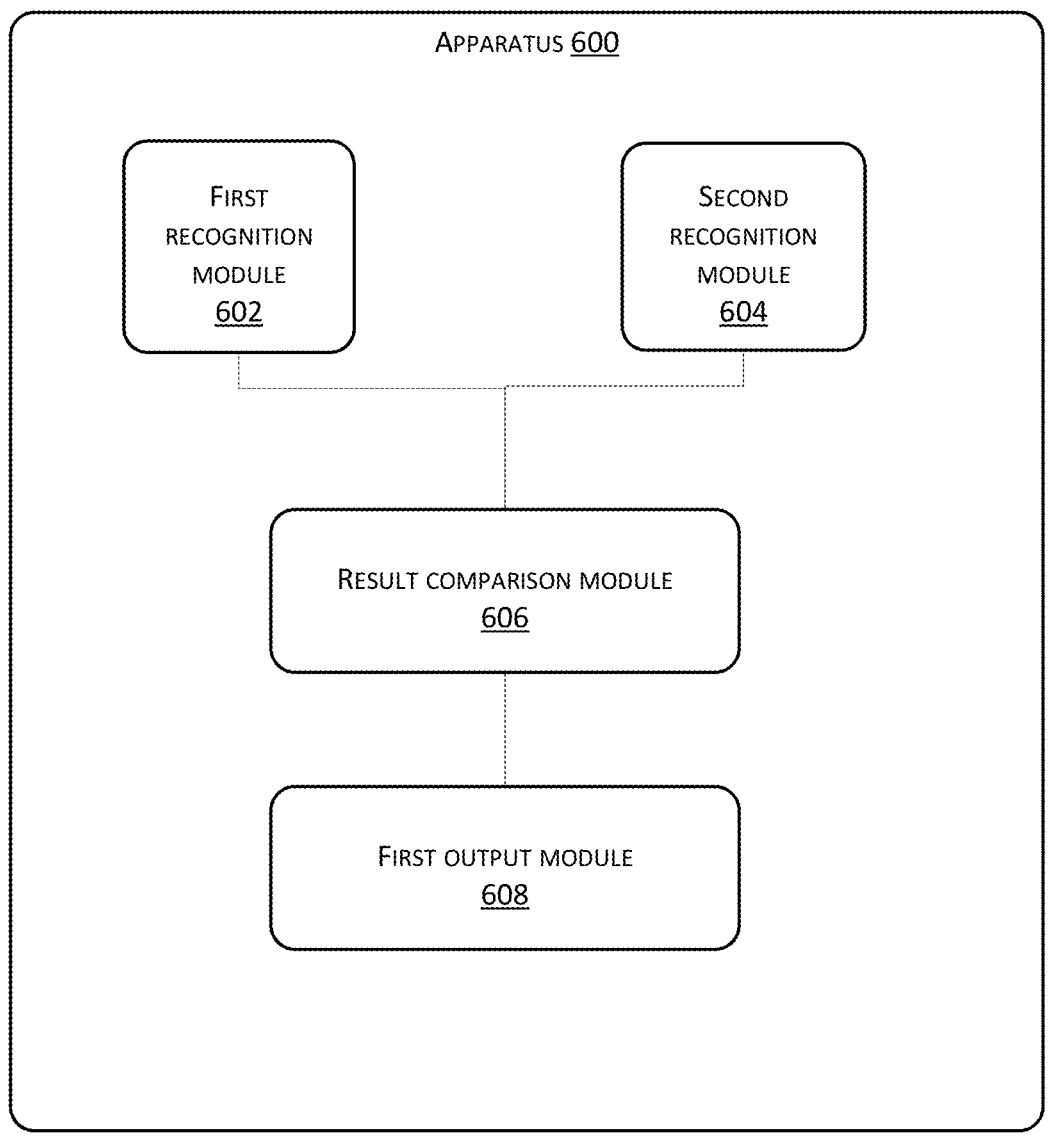
FIG. 6 is a block diagram of an implementation of a type prediction device for recognizing an object in an image provided by the present application.

Based on the method of recognizing an object (e.g., an object contained in an image) in an image described in the foregoing implementations or scenarios, the present application provides a type prediction apparatus for recognizing an object in an image. The apparatus may include a system (including a distributed system), a software (application), a module, a component, a server, etc., that use the method described herein together with necessary hardware-implementing means. Based on the same innovative ideas, in one implementation, the apparatus provided by the present application is as described in the following examples. As the problems solved by the apparatus and method are similar, reference may be made to the implementations of the foregoing method for the details of implementations of the apparatus in this application, and similarities are not mentioned herein. As used below, the term "unit" or "module" may implement a combination of software and/or hardware of a predetermined functionality. Although the apparatuses described in the following implementations are preferably implemented in software, hardware, or a combination of software and hardware is also possible and conceived. In implementations, FIG. 6 is a block diagram of an implementation of a type prediction apparatus 600 for recognizing an object in an image provided by the present application. As illustrated in FIG. 6, the apparatus 600 may include a first recognition module 602 configured to process an image to be processed using a full image recognition technique and obtain a first type prediction result for an object in the image to be processed, the full image recognition technique recognizing objects in images based on full image feature data; a second recognition module 604 configured to process a subject area of the image to be processed using a feature recognition technique and obtain a second type prediction result for an object in the subject area, the feature recognition technique recognize the objects of the images based on feature data in the subject area; a result comparison module 606 configured to determine whether the first type prediction result matches the second type prediction result; and a first output module 608 configured to determine a type of the object in the image to be processed to be the first type prediction result or the second type prediction result if the first type prediction result matches the second type prediction result.

The present application provides a type prediction apparatus for recognizing an object in an image, which uses two different type prediction methods on the object in the image to obtain corresponding type prediction results. The type prediction methods may include a method of object recognition based on full image feature data of the image and a method of object recognition based on feature data of a subject area of the image. The type prediction results may be then compared. If the results match each other, a type of the object of the image to be processed may be determined to be one of the results. The method based on the full image feature data has a higher recognition rate in object recognition, while the method based on the subject area has a higher accuracy in identifying a real object in the image to be processed. The implementations of the present disclosure combine the features of these two methods to obtain a subject meeting a predetermined condition and accurately identify what the subject is. The implementations not only reduce background interference but also solve problems such as information loss and false detection rates. The implementations further improve the accuracy and reliability of predicting a type of a recognized object in an image, thus making a prediction result of the type of the object in the image more accurate, and improving the accuracy and reliability of type prediction of the recognized object in the image.

Figure 7:
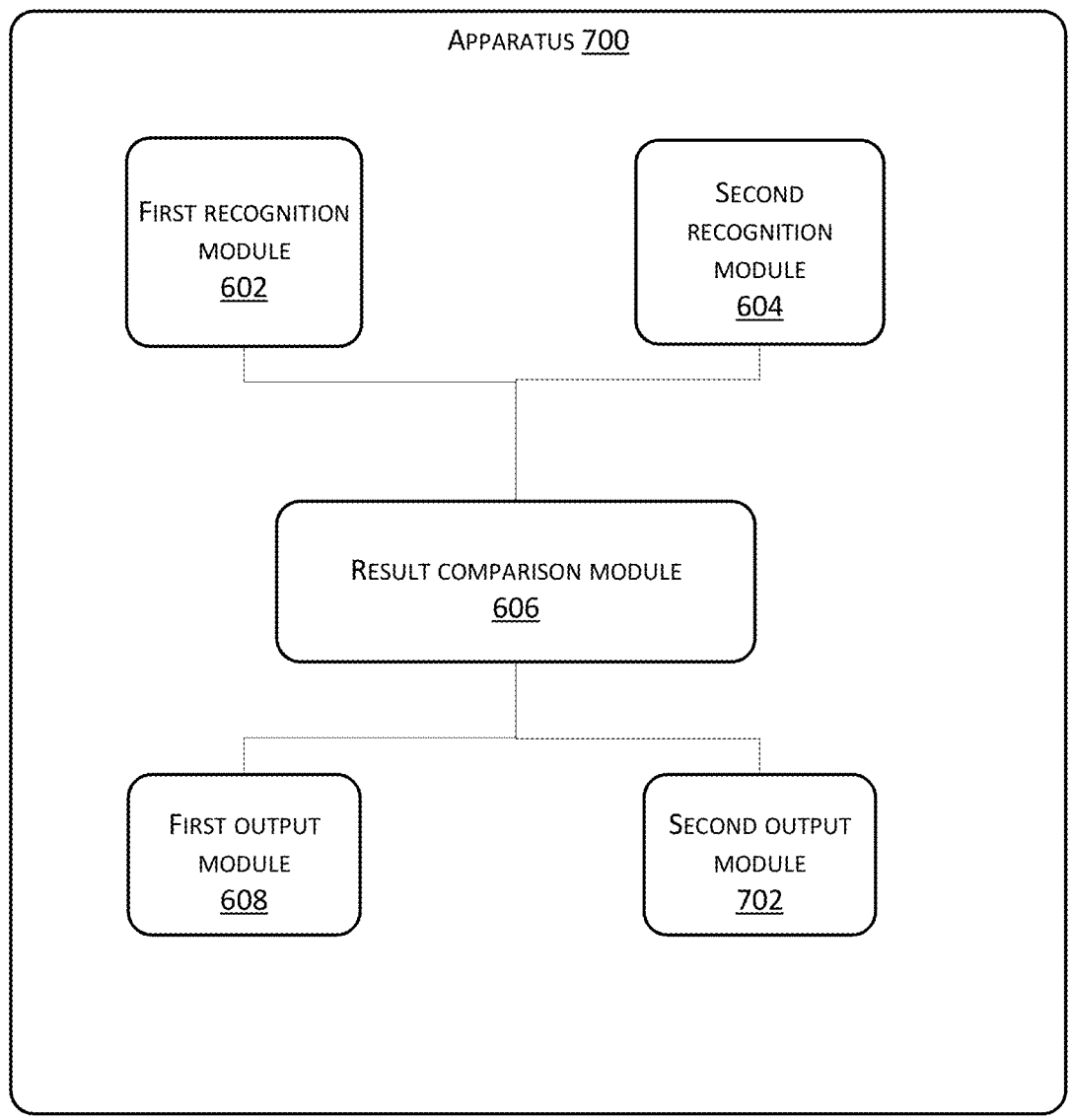
FIG. 7 is a block diagram of another implementation of a type prediction device for recognizing an object in an image provided by the present application.

FIG. 7 is a block diagram of another implementation of a type prediction apparatus 700 for recognizing an object in an image provided by the present application. As shown in FIG. 7, the apparatus 700 may further include a second output module 702 configured to process the subject area of the image to be processed using the full image recognition technique associated with the object in the image if the first type prediction result does not match the second type prediction result via the result comparison module 606, obtain a third type of prediction result of the object in the subject area, and determine the type of the object of the image to be processed to be the third type of prediction result or the second type prediction result. If the results obtained by using two methods are not the same, the identified subject area may again be subjected to image classification based on full image feature data to obtain a final output. The implementations of the present disclosure consider the problems of interference of background noise, an information loss and a false detection rate of subject detection in classification of a full image, make a prediction of a type of an object in an image more accurate.

In another implementation, the image to be processed may include more than one subject, for example, three subjects including fruits, clothes, and knives. In this case, one of candidate areas may be selected as the subject area. For example, a candidate area with the largest number of pixel points among the candidate areas may be selected as the subject area of the image to be processed. Alternatively, a candidate area that is closest to a position of a center point of the image to be processed may be selected as the subject area. In implementations, in response to a determination by the second recognition module that the image to be processed include more than two subjects, the apparatus may determine may include candidate areas having a subject respectively in the image to be processed, and select a candidate area meeting a predetermined condition from among the candidate areas having the subject as the subject area of the image to be processed.

With reference to the foregoing method, candidate areas may be identified by the second recognition module 604 using the following manner: analyzing the image to be processed using a selected subject analysis technique, and recognizing the subject of the image to be processed; determining a region scope of the subject based on coordinate information of boundary pixels of the recognized subject; and selecting the region scope as the candidate area.

Other embodiments of the present application further provide an apparatus when the first type prediction result is different from the second type prediction result. In cases of inconsistent prediction results, the subject area of the image to be processed may be used as a new full image, which is re-used by the first predetermined classification method to process an image classification.

In implementations, in response to a determination that the image to be processed includes more than two subjects obtained using the subject feature data of the image to be processed, subject areas of subjects are individually determined, and respective second type prediction results corresponding to the subject areas are obtained. Correspondingly, determining by the result comparison module whether the first type prediction result matches the second type prediction result may include determining whether the second type prediction results include a second type prediction result matching the first type prediction result; and determining that the first type prediction result matches the second type prediction results if affirmative. Correspondingly, the first recognition module 602 may designate the second type prediction result matching the first type prediction result as the type of the object of the image to be processed.

In implementations, as mentioned earlier, one of the candidate areas may be selected as the subject area. For example, a candidate area with the largest number of pixel points among candidate areas may be selected as the subject area of the image to be processed. Alternatively, a candidate area closest to a position of a center point of the image to be processed may be selected as the subject area.

Figure 8:
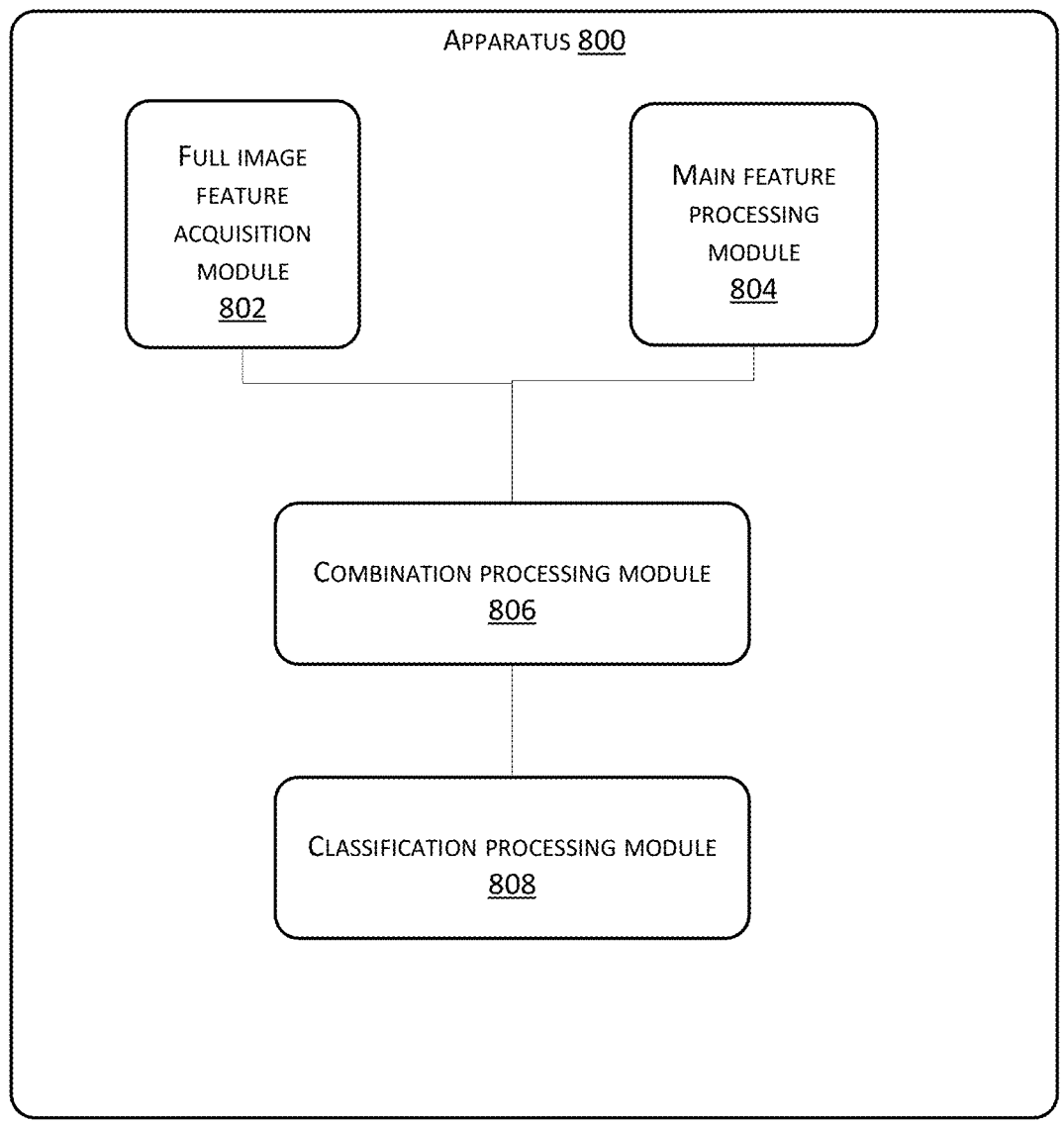
FIG. 8 is a block diagram of yet another implementation of a type prediction device for recognizing an object in an image provided by the present application.

Based on the ideas of identifying objects in an image to be processed based on two different image processing techniques, the present application may also combine the feature data acquired by the methods that are based on the subject feature data and the full image feature data. Identification of an object in the image data is then performed using the combined feature data. The combined feature data contains the features obtained from processing based on the full image feature data and the subject feature data. The method based on the full image feature data has a higher recognition rate in object recognition, and the method based on the subject area has a higher accuracy in identifying real objects in the image to be processed. Another method for identifying an object in an image to be processed provided in the present application may allow the combined feature data to have characteristics of the two methods, and reduce problems of interference of background noise, information losses and false detection rates of subject detection in classification of full images, thus optimizing outputs and being able to effectively improve the accuracy of identifying items in the images. FIG. 8 is a block diagram of another implementation of a type prediction apparatus 800 for recognizing an object in an image provided by the present application. As shown in FIG. 8, the apparatus 800 may include a full image feature acquisition module 802 configured to process an image to be processed using a full image recognition technique, and obtain full image feature data of the image to be processed, the full image recognition technique recognizing an object in the image based on the full image feature data; a main feature processing module 804 configured to process a subject area of the image to be processed using a feature recognition technique, and obtain subject feature data of the subject area, the feature recognition technique recognizing the object in the image based on the feature data of the subject area; a combination processing module 806 configured to perform feature data combination of the full image feature data and the subject feature data using a predetermined method to obtain combined feature data; and a classification processing module 808 configured to recognize the object in the image to be processed using the combined feature data to determine a type of the object of the image to be processed.

An implementation of obtaining the full image feature data or the subject feature data may include using the HOG, SIFT or Deep Convolutional Neural Networks, Selective Search algorithm, and the like, as described in the foregoing implementations. The feature data combination of the full image feature data and the subject feature data may be performed using a predetermined method or using another predetermined feature data combination technique. For example, the feature data may be directly spliced together.

The apparatuses according to the description of the methods of the present application may further include other implementations, and details of implementations of the apparatuses may also refer to the description of the corresponding methods.

The above-mentioned apparatuses or methods may be used in a variety of terminal electronic devices that process image information, for example, in a mobile terminal of a user, an APP (application). The implementations of the present application may effectively improve the accuracy of type prediction results of objects in images taken by terminal devices, and provide a better data foundation for results outputted by subsequent terminal applications such as image classification or object searches. Accordingly, the implementations further relate to an electronic device which includes processor(s) and memory for storing processor-executable instructions. The processor(s) execute(s) the instructions to implements acts including: processing an image to be processed using a full image recognition technique, and obtaining a first type prediction result of the object in the image to be processed, the full image recognition technique recognizing an object in the image based on full image feature data; processing a subject area of the image to be processed using a feature recognition technique, and obtaining a second type prediction result of the object of the subject area, the feature recognition technique recognizing the object in the image based on feature data of the subject area; determining whether the first type prediction result matches the second type prediction result; and determining a type of the object of the image to be processed to be the first type prediction result or the second type prediction result if the first type prediction result matches the second type prediction result.

The electronic device may include a mobile communication terminal, a hand-held device, an in-vehicle device, a wearable device, a television device, a computing device, an IoT device (Internet of Things) and the like.

In another implementation of the electronic device, the acts may further include: if the first type prediction result does not match the second type prediction result, processing the subject area of the image to be processed using the full image recognition technique associated with the object in the image, and obtaining a third type of prediction result of the object in the subject area; and determining the type of the object of the image to be processed to be the third type of prediction result or the second type prediction result.

The present application further provides another implementation of an electronic device, to recognize object(s) in an image to be processed based on a combination of subject feature data and full image feature data. In implementations, the electronic device may include processor(s) and memory for storing processor-executable instructions. The processor(s) execute(s) the instructions to implements acts including processing an image to be processed using a full image recognition technique, and obtaining full image feature data of the image to be processed, the full image recognition technique recognizing an object in the image based on full image feature data; processing a subject area of the image to be processed using a feature recognition technique, and obtaining subject feature data of the subject area, the feature recognition technique recognizing the object in the image based on the feature data of the subject area; performing feature data combination of the full image feature data and the subject feature data using a predetermined method to obtain combined feature data; and using the combined feature data to recognize the object in the image to be processed, and determining a type of the object of the image to be processed.

Figure 9:
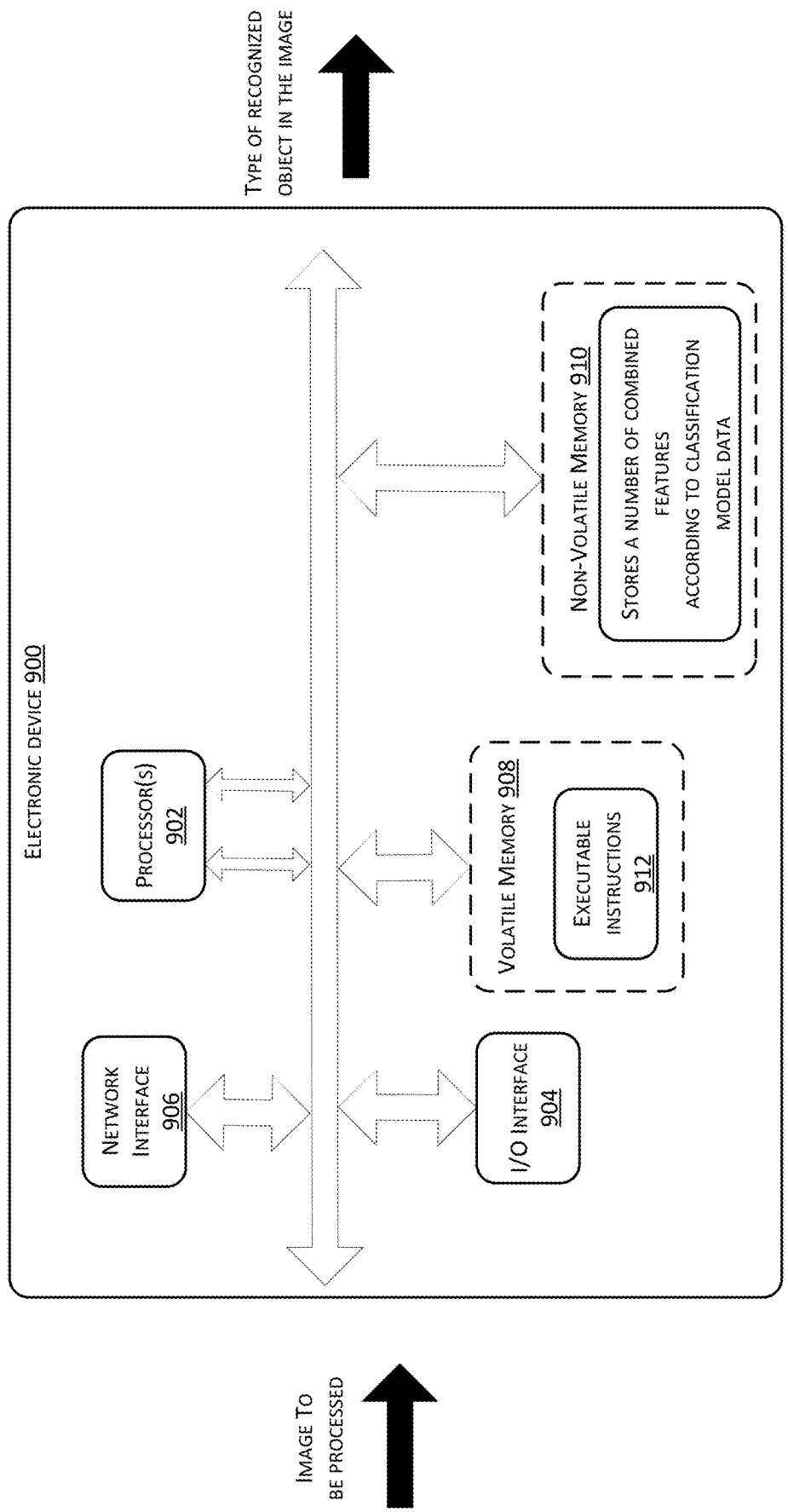
FIG. 9 is a schematic diagram of an implementation of the electronic device provided by the present application.

FIG. 9 is a schematic diagram of an implementation of the electronic device 900 provided by the present application. In implementations, the electronic device 900 according to the description of the methods of the present application may further include other implementations, and reference may be made to the description of corresponding methods or apparatuses. In implementations, the electronic device 900 may include one or more processors 902, an input/output (I/O) interface 904, a network interface 906, volatile memory 908, and non-volatile memory 910.

The methods described in the above embodiments of the present application may be implemented by the one or more processors 902 executing a computer program (computer instructions) 912 on a computer-readable storage media. The computer program 904 may be stored in the volatile memory 908, such as computer-readable storage media (e.g., a magnetic tape, a magnetic disk, an optical disk, ROM or another computer-readable medium). Accordingly, the present application also provides computer readable storage media storing computer instructions 912. The computer instructions 912, when executed, cause the one or more processors 902 to implement acts including: processing an image to be processed using a full image recognition technique, and obtaining a first type prediction result of the object in the image to be processed, the full image recognition technique recognizing an object in the image based on full image feature data; processing a subject area of the image to be processed using a feature recognition technique, and obtaining a second type prediction result of the object of the subject area, the feature recognition technique recognizing the object in the image based on feature data of the subject area; determining whether the first type prediction result matches the second type prediction result; and determining a type of the object of the image to be processed to be the first type prediction result or the second type prediction result if the first type prediction result matches the second type prediction result.

Other embodiments of the present application further provide processing methods when the first type prediction result is different from the second type prediction result. In cases of inconsistent prediction results, the subject area of the image to be processed may be used as a new full image, which is re-used by the type-prediction method of recognizing an object in the image to be processed based on the full image feature data to process the subject area of the image to be processed. In another implementation, the computer instructions, when executed, cause the processor(s) to further implement acts including: processing the subject area of the image to be processed using the full image recognition technique associated with the object in the image if the first type prediction result does not match the second type prediction result, and obtaining a third type of prediction result of the object in the subject area; and determining the type of the object of the image to be processed to be the third type of prediction result or the second type prediction result.

The computer instructions stored in the computer-readable storage media provided by the present application, when executed, can cause the processor(s) to use two different type prediction methods on the object in the image to obtain corresponding type prediction results. The type prediction methods may include a method of object recognition based on full image feature data of the image and a method of object recognition based on feature data of a subject area of the image. The type prediction results may be then compared. If the results match each other, a recognition result of the image to be processed is outputted. The implementations of the present disclosure consider problems of interference of background noise, information losses and false detection rates of subject detection in classification of full images, and combine a processing method based on full image feature data that has a higher recognition rate of identifying objects and a processing method based on subject feature data that has a higher accurate rate of identifying real subjects of images to be processed. The implementations further improve the accuracy and reliability of type recognition of an object in an image, thus making a type prediction result of the object in the image more accurate, and improving the accuracy and reliability of type prediction of the object in image recognition.

In another implementation of the computer-readable storage media provided by the present application, to recognize an object in an image to be processed based on a combination of subject feature data and full image feature data. In another implementation, the computer-readable storage media provided by the present application may store computer instructions. The computer instructions, when executed by processor(s), cause the processor(s) to perform acts including: processing an image to be processed using a full image recognition technique, and obtaining full image feature data of the image to be processed, the full image recognition technique recognizing an object in the image based on full image feature data; processing a subject area of the image to be processed using a feature recognition technique, and obtaining subject feature data of the subject area, the feature recognition technique recognizing the object in the image based on the feature data of the subject area; performing a feature data combination of the full image feature data and the subject feature data using a predetermined method, and obtaining combined feature data; and using the combined feature data to recognize the object in the image to be processed, and determining a type of the object of the image to be processed.

Although the specification of the present application describes a first pre-determined classification method of HOG or SIFT, and RPN for calculating candidate areas, classification labels using CNN network outputting subject areas, calculation using feature data as well as combination techniques, a matching method for a first type prediction result and a second type prediction result, and other image processing, calculation and prediction techniques, the present application is not limited to implementations that conform to standards of image data processing, standard image algorithms, or application situations described in the implementations. Some industry standards or implementation solutions with slight modifications based on the implementations described herein may also achieve the same, equivalent or similar, or predictable effects after making the modifications to the above implementations. The implementations obtained by applying these modified or deformed data definitions, calculations, storages, interaction modes and the like, still fall within the scope of alternative embodiments of the present application.

Although the present application provides the method operations as described in the implementations or flowcharts, more or fewer operations may be included based on conventional or non-creative means. The order of operations listed in the implementations is only one of the many orders of execution and does not mean to be the only order of execution. When an actual device or terminal product is executed, execution can be performed sequentially or in parallel according to the order described in the method of the implementation or figure (e.g., in parallel processor or multi-threaded environment, even for distributed data processing environments). Moreover, terms "comprising", "including" or any other variation thereof, are intended to cover a non-exclusive inclusion, such that a series of elements including the process, method, article or apparatus include not only those elements, but also include other elements not expressly listed, or inherent elements included in the process, method, article, or apparatus. In the absence of more restrictions, the process, method, article, or apparatus include the elements does not exclude an existence of additional identical or equivalent elements.

The units, apparatuses or modules, etc. described in the above embodiments may be implemented by a computer chip or an entity, or a product having certain functionalities. For the sake of description, when the above apparatuses are described, the functions are divided into various modules and described separately. Apparently, the functions of the modules can be implemented in one or more software and/or hardware components. A module realizing a function may also be implemented by a combination of multiple sub-modules or sub-units. The implementations of the apparatuses described above are merely illustrative. For example, a division of units are just for a logical division of functions. Another way of division can exist in an actual implementation. For example, a plurality of units or components may be combined or may be integrated into another system, or some features can be ignored, or not executed. Further, communication connections involved in the implementations of the methods, apparatuses or electronic devices may be connected via interfaces, indirect coupling or communication connections between devices or units, which may be electrical, mechanical or another form.

In the 1990s, a technical improvement may be clearly differentiated by hardware improvements (for example, improvements in circuit structures such as diodes, transistors, switches, etc.) or software improvements (improvements in method processes). However, with the development of technologies, many of today's method process improvements can be seen as a direct improvement in hardware circuit architectures. Designers may incorporate improved methods to hardware circuits to get the corresponding hardware circuit structures. Accordingly, a method of process improvement may be achieved with hardware entity modules. For example, a programmable logic device (Programmable Logic Device, PLD) (e.g., Field Programmable Gate Array, FPGA) is one such integrated circuit logic function performed and determined by a user to program the device. With a designer to program a digital system for "integrating" into a PLD on his/her own, it is not necessary to have a chip manufacturer to design and manufacture a dedicated integrated circuit chip. Further, by replacing manually produced integrated circuit chips, this type of programming is also mostly replaced by "logic compiler" software. Similar to a software compiler, such logic compiler compiles original codes written by a specific programming language, which is called a hardware description language (Hardware Description Language, HDL). HDL is not the only one, and there are many kinds, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc. The most common ones are VHDL (Very-High-Speed Integrated Circuit Hardware Description Language) and Verilog. One skilled in the art should understand that a logic method flow may be achieved in hardware circuits by performing a little logic programming and compiling these methods into an integrated circuit using hardware description language.

A controller can be realized in any suitable methods. For example, the controller can be implemented using, for example, a microprocessor or processor with computer-readable media, logic gates, switches, an application specific integrated circuit (ASIC), programmable logic controllers and embedded microcontrollers, that store computer readable program codes (e.g., software or firmware) executable by the (micro)processor. Examples of controllers include, but are not limited to, the following microcontrollers: ARC 625D, Atmel AT91SAM, Microchip PIC18F26K20, and Silicon Labs C8051F320. A controller of memory may also be implemented as a part of control logic of the memory. One skilled in the art also knows that there are other methods implementing the controller in addition to pure computer readable program codes. Logic programming of the methods may be performed to implement the same functionalities using a way such as controlling logic gates, switches, application specific integrated circuits, programmable logic controllers, and embedded microcontrollers. Therefore, this controller may be considered to be a hardware component, and include modules for implementing various functions and being considered as a part of hardware structures. Therefore, a system or apparatus may be considered as software modules and/or hardware structures.

The units, apparatuses, modules, etc., described in the above embodiments may be implemented by a computer chip or an entity, or a product having certain functionalities. A typical implementation of an apparatus is a computer. In implementations, the computer may be, for example, a personal computer, a laptop computer, a vehicle-mounted human interaction device, a cell phone, a camera phone, a smartphone, a personal digital assistant, a media player, a navigation device, an email device, a game console, a tablet computer, a wearable device, or any combination of these devices.

Although the present application provides the method operations as described in the implementations or flowcharts, more or fewer operations may be included based on conventional or non-creative means. The order of operations listed in the implementations is only one of the many orders of execution and does not mean to be the only order of execution. When an actual device or terminal product is executed, execution can be performed sequentially or in parallel according to the order described in the method of the implementation or figure (e.g., in parallel processor or multi-threaded environment, even for distributed data processing environments). Moreover, terms "comprising", "including" or any other variation thereof, are intended to cover a non-exclusive inclusion, such that a series of elements including the process, method, article or apparatus include not only those elements, but also include other elements not expressly listed, or inherent elements included in the process, method, article, or apparatus. In the absence of more restrictions, the process, method, article, or apparatus include the elements does not exclude an existence of additional identical or equivalent elements.

For the sake of description, when the above apparatuses are described, the functions are divided into various modules and described separately. Apparently, the functions of the modules can be implemented in one or more software and/or hardware components. A module realizing a function may also be implemented by a combination of multiple sub-modules or sub-units. The implementations of the apparatuses described above are merely illustrative. For example, a division of units are just for a logical division of functions. Another way of division can exist in an actual implementation. For example, a plurality of units or components may be combined or may be integrated into another system, or some features can be ignored, or not executed. Further, communication connections involved in the implementations of the methods, apparatuses or electronic devices may be connected via interfaces, indirect coupling or communication connections between devices or units, which may be electrical, mechanical or another form.

One skilled in the art also knows that there are other methods implementing a controller in addition to pure computer readable program codes. Logic programming of the methods may be performed to implement the same functionalities using a way such as controlling logic gates, switches, application specific integrated circuits, programmable logic controllers, and embedded microcontrollers. Therefore, this controller may be considered to be a hardware component, and include modules for implementing various functions and being considered as a part of hardware structures. Therefore, a system or apparatus may be considered as software modules and/or hardware structures.

The present disclosure is described with reference to flowcharts and/or block diagrams of the methods, devices (systems), and computer program products according to the embodiments of the present disclosure. It should be understood that computer program instructions may be used to implement each process and/or block in the flowcharts and/or block diagrams and a combination of process(es) and/or block(s) in the flowcharts and/or the block diagrams. These computer program instructions may be provided to a general-purpose computer, a special-purpose computer, an embedded processor, or a processor of another programmable data processing terminal device to generate a machine, so that the instructions executed by a computer or a processor of another programmable data processing device generate an apparatus for implementing function(s) specified in one or more processes in the flowcharts and/or in one or more blocks in the block diagrams.

These computer program instructions may also be stored in a computer readable storage device that can instruct a computer or another programmable data processing terminal device to perform operations in a particular manner, such that the instructions stored in the computer readable storage device generate an article of manufacture that includes an instruction apparatus. The instruction apparatus implements function(s) that is/are specified in one or more processes in the flowcharts and/or in one or more blocks in the block diagrams.

These computer program instructions may also be loaded onto a computer or another programmable data processing device, such that a series of operations are performed on the computer or the other programmable device, thereby generating computer-implemented processing. Therefore, the instructions executed on the computer or the other programmable device provide a procedure for implementing function(s) specified in one or more processes in the flowcharts and/or in one or more blocks in the block diagrams.

In a typical configuration, a computing device includes one or more processors (CPU), input/output interfaces, network interfaces, and memory. In implementations, the foregoing apparatuses 600, 700 and 800 may include one or more computing devices which are located locally or distributed over a network (e.g., a cloud computing architecture). In implementations, the apparatuses 600, 700 and 800 may be a part of one or more computing devices which are located locally or distributed over a network (e.g., a cloud computing architecture).

The memory may include a form of computer readable media such as a volatile memory, a random access memory (RAM) and/or a non-volatile memory, for example, a read-only memory (ROM) or a flash RAM. The memory is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Implementations of the present application provide methods, systems, or computer program products. Accordingly, the present disclosure may be entirely implemented by hardware, software, or a combination of hardware and software. Further, the present disclosure can be used in one or more computer usable storage media (including, but not limited to, a magnetic storage device, CD-ROM, an optical disk storage device, etc.) that contain computer usable program codes and are implemented on a computer program product.

The present application may be described in the general context of computer-executable instructions executed by a computer, such as program modules. In general, program modules include routines, programs, objects, components, data structures, etc., that perform specific tasks or implement specific abstract data types. The embodiments of the present disclosure may also be implemented in a distributed computing environment. In these distributed computing environments, tasks are performed by a remote processing device connected via a communication network. In a distributed computing environment, the program modules may be located in local and remote computer storage media, including storage devices.

This specification describes the above embodiments in a progressive manner, and the same or similar parts of the various embodiments can be referenced to each other. Emphasis of each embodiment is different from those of other embodiments. In particular, since system embodiments are substantially similar to the method embodiments, a description thereof is relatively simple. Related portions can be referenced to the portions of the method embodiments.

The foregoing is only preferred implementations of the present disclosure, and is not intended to limit the present application. One skilled in the art should understand that various modifications and changes exist in the present disclosure. Any modifications, equivalent replacements and improvements, etc., that are made within the spirits and principles of the present disclosure, are also included in the scope of protection of the present application.

What is claimed is:

1. A method comprising:
processing an image using full image recognition to obtain a first type prediction result of an object in the image based on full image feature data of the image;
processing a subject area of the image using feature recognition to obtain a second type prediction result of an object in the subject area in the image based on feature data of the subject area;
determining whether the first type prediction result matches the second type prediction result;
upon determining that the first type prediction result matches the second type prediction result, determining a type of the object in the image to be either the first type prediction result or the second type prediction result; and
upon determining that that the first type prediction result does not match the second type prediction result:
processing the subject area of the image using the full image recognition technique associated,
obtaining a third type of prediction result of the object in the subject area, and
determining the type of the object of the image to be processed to be the third type of prediction result or the second type prediction result.

2. The method of claim 1, wherein processing the image using the full image recognition to obtain the first type prediction result of the object in the image comprises:
calculating visual feature data of the full image feature data of the image;
performing a classification prediction based on the visual feature data; and
obtaining the first type prediction result of the object in the image.

3. The method of claim 1, wherein processing the subject area of the image using the feature recognition to obtain the second type prediction result of the object of the subject area comprises:
detecting a subject in the image to determine the subject area containing the subject;
calculating subject feature data of the subject area;
performing a classification prediction based on the subject feature data; and
obtaining the second type prediction result corresponding to the subject area.

4. The method of claim 3, wherein: if the image includes a plurality of subjects, detecting the subject area including the subject comprises:
determining candidate areas containing at least one subject in the image;
selecting a candidate area meeting a predetermined condition from the candidate areas as the subject area of the image.

5. The method of claim 4, wherein a candidate area is determined by:
analyzing the image using a selected subject analysis technique to recognize a subject of the image;
determining region scope for the subject based on coordinate information of boundary pixels of the subject; and
treating the region scope as the candidate area.

6. The method of claim 1, wherein determining whether the first type prediction result matches the second type prediction result comprises:
determining whether label data of the first type prediction result is identical to label data of the second type prediction result, and determining that the first type prediction result matches the second type prediction result if the label data of the first type prediction result is identical to label data of the second type prediction result; or
determining whether the label data of the first type prediction result and the label data of the second type prediction result belong to a same classification prediction, and determining that the first type prediction result matches the second type prediction result if the label data of the first type prediction result and the label data of the second type prediction result belong to the same classification prediction.

7. The method of claim 1, further comprising:
determining that the image includes a plurality of subjects by the full image recognition;
determining respective subject areas of subjects; and
obtaining respective second type prediction results corresponding to the respective subject areas.

8. The method of claim 7, wherein determining whether the first type prediction result matches the second type prediction result comprises:
determining whether a second type prediction result in the respective second type prediction results matching the first type prediction result.

9. The method of claim 8, wherein determining that the first type prediction result matches the second type prediction result if a second type prediction result in the respective second type prediction results matching the first type prediction result, and wherein the method further comprises:
designating the second type prediction result matching the first type prediction result as the type of the object of the image.

10. One or more computer readable media storing executable instructions that, when executed by one or more processors, cause the one or more processors to perform acts comprising:
processing an image using a full image recognition technique to obtain a first type prediction result of an object in the image;
processing a subject area of the image using a feature recognition technique to obtain a second type prediction result of the object in the subject area;
determining whether the first type prediction result matches the second type prediction result;
upon determining that the first type prediction result matches the second type prediction result, determining a type of the object in the image to be the first type prediction result or the second type prediction result; and
upon determining that that the first type prediction result does not match the second type prediction result:
processing the subject area of the image using the full image recognition technique associated,
obtaining a third type of prediction result of the object in the subject area, and determining the type of the object of the image to be processed to be the third type of prediction result or the second type prediction result.

11. The one or more computer readable media of claim 10, wherein processing the image using the full image recognition technique to obtain the first type prediction result of the object in the image comprises:
    calculating visual feature data of the full image feature data of the image;
    performing a classification prediction based on the visual feature data; and
    obtaining the first type prediction result of the object in the image.

12. The one or more computer readable media of claim 10, wherein processing the subject area of the image using the feature recognition technique to obtain the second type prediction result of the object of the subject area comprises
    analyzing a subject in the image to determine the subject area including the subject;
    calculating subject feature data of the subject area;
    performing a classification prediction based on the subject feature data; and
    obtaining the second type prediction result corresponding to the subject area.

13. The one or more computer readable media of claim 12, wherein: if the image includes a plurality of subjects, determining the subject area including the subject comprises selecting a candidate area meeting a predetermined condition from candidate areas having the subjects as the subject area of the image, and wherein the candidate area is an image area having a subject from the image.

14. The one or more computer readable media of claim 13, wherein the candidate areas are determined by:
    analyzing the image using a selected subject analysis technique to recognize the plurality of subjects of the image;
    determining respective region scopes of the plurality of subjects based on coordinate information of boundary pixels of the plurality of subjects; and
    selecting the respective region scopes as the candidate areas.

15. The one or more computer readable media of claim 10, wherein determining whether the first type prediction result matches the second type prediction result comprises:
    determining whether label data of the first type prediction result is identical to label data of the second type prediction result, and determining that the first type prediction result matches the second type prediction result if the label data of the first type prediction result is identical to label data of the second type prediction result; or
    determining whether the label data of the first type prediction result and the label data of the second type prediction result belong to a same classification prediction, and determining that the first type prediction result matches the second type prediction result if the label data of the first type prediction result and the label data of the second type prediction result belong to the same classification prediction.

16. The one or more computer readable media of claim 10, the acts further comprising:
    determining subject areas of subjects in response to determining that the image includes a plurality of subjects;
    obtaining second type prediction results corresponding to the subject areas, wherein determining whether the first type prediction result matches the second type prediction result comprises:
        determining whether the second type prediction results include a second type prediction result matching the first type prediction result, and
        determining that the first type prediction result matches the second type prediction result if the second type prediction results include the second type prediction result matching the first type prediction result; and
        designating the second type prediction result matching the first type prediction result as the type of the object of the image.

17. An apparatus comprising:
one or more processors; and
memory coupled to the one or more processors, the memory storing executable modules by the one or more processors, that when executed by the one or more) processors, perform corresponding associated operations, the modules including:
    a full image feature acquisition module configured to process an image using a full image recognition technique to obtain full image feature data of the image;
    a main feature processing module configured to process a subject area of the image using a feature recognition technique to obtain subject feature data of the subject area;
    a fusion processing module configured to combine the full image feature data and the subject feature data using a predetermined method to obtain combined feature data; and
    a classification processing module configured to recognize an object in the image using the combined feature data and to determine a type of the object in the image including:
        upon determining that the first type prediction result matches the second type prediction result, determining a type of the object in the image to be either the first type prediction result or the second type prediction result; and
        upon determining that that the first type prediction result does not match the second type prediction result:
            processing the subject area of the image using the full image recognition technique associated,
            obtaining a third type of prediction result of the object in the subject area, and
            determining the type of the object of the image to be processed to be the third type of prediction result or the second type prediction result.

18. The apparatus of the claim 17, wherein the classification processing module is further configured to recognize the object in the image using the combined feature data by:
    performing a classification prediction using a combined feature prediction model with the combined feature data as an input, wherein the combined feature prediction model is established by:
        calculating respective full image feature data and respective subject feature data of a predetermined number of sample images using the full image recognition technique and the feature recognition technique;
        combining the respective full image feature data and the respective subject feature data to obtain respective combined feature data of the sample images; and training a selected image classification model using the respective combined feature data of the sample images to obtain the combined feature prediction model.

* * * * *